United States Patent
Hayashi et al.

(10) Patent No.: US 9,738,782 B2
(45) Date of Patent: Aug. 22, 2017

(54) EPOXY RESIN COMPOSITION, PREPREG AND FIBER-REINFORCED COMPOSITE MATERIALS

(75) Inventors: Mami Hayashi, Iyo-gun (JP); Takayuki Fujiwara, Iyo-gun (JP); Jun Misumi, Iyo-gun (JP); Kenichi Yoshioka, Iyo-gun (JP)

(73) Assignee: TORAY INDUSTRIES, INC., Tokyo (JP)

( * ) Notice: Subject to any disclaimer, the term of this patent is extended or adjusted under 35 U.S.C. 154(b) by 328 days.

(21) Appl. No.: 13/823,004

(22) PCT Filed: Sep. 26, 2011

(86) PCT No.: PCT/JP2011/071842
§ 371 (c)(1),
(2), (4) Date: Mar. 28, 2013

(87) PCT Pub. No.: WO2012/043453
PCT Pub. Date: Apr. 5, 2012

(65) Prior Publication Data
US 2013/0217805 A1    Aug. 22, 2013

(30) Foreign Application Priority Data

| Sep. 28, 2010 | (JP) | 2010-216632 |
| Sep. 28, 2010 | (JP) | 2010-216633 |
| Mar. 4, 2011 | (JP) | 2011-047406 |
| Mar. 4, 2011 | (JP) | 2011-047407 |

(51) Int. Cl.
| C08L 63/00 | (2006.01) |
| C08L 63/02 | (2006.01) |
| C08G 59/06 | (2006.01) |
| C08G 59/10 | (2006.01) |
| C08G 59/32 | (2006.01) |
| C08G 59/38 | (2006.01) |
| C08J 5/24 | (2006.01) |

(52) U.S. Cl.
CPC .......... *C08L 63/00* (2013.01); *C08G 59/3245* (2013.01); *C08G 59/38* (2013.01); *C08J 5/24* (2013.01); *C08J 2363/00* (2013.01); *C08L 2205/02* (2013.01)

(58) Field of Classification Search
USPC .................... 523/427; 525/94, 526
See application file for complete search history.

(56) References Cited

U.S. PATENT DOCUMENTS

| 5,874,009 | A * | 2/1999 | Inada et al. ................. 216/20 |
| 6,399,199 | B1 * | 6/2002 | Fujino .................. D01F 6/92 |
| | | | 428/378 |
| 8,278,389 | B2 * | 10/2012 | Tomioka et al. ........... 525/92 H |
| 2001/0033992 | A1 * | 10/2001 | Kita .................. 430/273.1 |
| 2004/0034124 | A1 | 2/2004 | Court et al. |
| 2009/0143526 | A1 * | 6/2009 | Hirose .................. 524/611 |
| 2009/0198012 | A1 | 8/2009 | Sakata et al. |
| 2010/0209642 | A1 | 8/2010 | Tomioka et al. |
| 2011/0009528 | A1 | 1/2011 | Tomioka et al. |

FOREIGN PATENT DOCUMENTS

| EP | 2333010 A1 | 6/2011 | |
| JP | 62-1717 A | 1/1987 | |
| JP | 62-1719 A | 1/1987 | |
| JP | 62001717 A * | 1/1987 | |
| JP | 2003-535181 A | 11/2003 | |
| JP | WO 2008072769 A1 * | 6/2008 | .......... C08G 59/504 |
| JP | 2009-74009 A | 4/2009 | |
| WO | WO 2006/077153 A2 | 7/2006 | |
| WO | WO 2008/143044 A1 | 11/2008 | |
| WO | WO 2008143044 A1 * | 11/2008 | |
| WO | WO 2009/107697 A1 | 3/2009 | |
| WO | WO 2010/035859 A1 | 4/2010 | |

OTHER PUBLICATIONS

STN Registry, "Cas. No. 31305-94-9," entered 1984.*
International Search Report for PCT/JP2011/071842 mailed on Dec. 27, 2011.
Written Opinion of the International Searching Authority for PCT/JP2011/071842 mailed on Dec. 27, 2011.

* cited by examiner

*Primary Examiner* — Randy Gulakowski
*Assistant Examiner* — Ha S Nguyen
(74) *Attorney, Agent, or Firm* — Birch, Stewart, Kolasch & Birch, LLP

(57) ABSTRACT

An epoxy resin composition containing an epoxy resin [A1], epoxy resin [B1], epoxy resin [C1] and curing agent [D] wherein [A1] is a bisphenol-type epoxy resin with a softening point of 90° C. or more, [B1] is a tri- or higher functional amine-type epoxy resin, [C1] is a bisphenol F-type epoxy resin with a number average molecular weight of 450 or less, and the epoxy resins [A1] to [C1] satisfy the following contents per 100 parts by mass of total epoxy resin content: [A1] 20 to 50 parts by mass, [B1] 30 to 50 parts by mass and [C1] 10 to 40 parts. The present invention provides low-viscosity epoxy resin compositions that are excellent in impregnating reinforcing fibers and capable of producing cured resins with excellent modulus and toughness, as well as prepregs and fiber-reinforced composite materials based on those epoxy resin compositions.

14 Claims, No Drawings

US 9,738,782 B2

EPOXY RESIN COMPOSITION, PREPREG AND FIBER-REINFORCED COMPOSITE MATERIALS

TECHNICAL FIELD

The present invention relates to an epoxy resin composition advantageously usable as matrix resins for fiber-reinforced composite materials suitable for sports and general industrial applications, as well as prepregs and fiber-reinforced composite materials based thereon as their matrix resins.

BACKGROUND ART

Fiber-reinforced composite materials based on reinforcing fibers, such as carbon fiber and aramid fiber, are widely used in diverse fields to take advantage of their high specific strength and specific modulus. Examples include structural material applications, such as aircraft and motor vehicles, sports applications, such as tennis rackets, golf shafts and fishing rods, and general industrial applications. Typical methods to manufacture such fiber-reinforced composite materials include the prepreg-based method, which involves the lamination of prepregs, each sheet-like intermediate material obtained by impregnating reinforcing fibers with a matrix resin, and curing the laminate. The prepreg-based method is advantageous in that it facilitates the production of high performance fiber-reinforced composite materials by allowing strict control of the orientation of reinforcing fibers and offering a high degree of design freedom for laminate configuration. As prepreg matrix resins, thermosetting resins are mainly used from the viewpoint of heat resistance and productivity, and, of them, epoxy resins are particularly advantageously used from the viewpoint of bonding with reinforcing fibers and other mechanical characteristics.

In addition to ongoing moves to achieve weight reduction by replacing metals and other existing materials with fiber-reinforced composite materials, moves to pursue further weight reduction in fiber-reinforced composite materials themselves have been gathering momentum in recent years. Methods to achieve such weight reduction include the use of reinforcing fibers with higher modulus to reduce the weight of fiber-reinforced composite materials while maintaining their stiffness. However, increasing the modulus of reinforcing fibers tends to reduce fiber-direction compressive strength and other strength characteristics. To improve fiber-direction compressive strength and other strength characteristics, it is effective to improve the modulus of epoxy resins as matrix resins.

Techniques to improve the modulus of epoxy resins include the blending in of an inorganic filler, such as a carbon nanotube, or an amine-type epoxy resin with a high modulus.

For instance, patent document 1 shows that the use of an amine-type epoxy resin with a high modulus has improved the modulus of an epoxy resin composition, leading to a dramatic improvement in the fiber-direction flexural strength, a characteristic with a high degree of correlation with fiber-direction compression strength, of fiber-reinforced composite materials based on such an epoxy resin as their matrix resin. However, this method reduces the impact resistance of fiber-reinforced composite materials due to reduction in the toughness of the epoxy resin.

To improve the impact resistance of a fiber-reinforced composite material, it is necessary to improve the elongation of the reinforcing fibers and the toughness and plastic deformation capacity of the epoxy resin as ingredients of the fiber-reinforced composite material. Of these, improvement of the toughness of the epoxy resin is considered particularly important and effective.

To improve the toughness of an epoxy resin, methods such as the blending of a rubber component or thermoplastic resin with excellent toughness have so far been tried. However, since rubbers have much lower moduli of elasticity and glass transition temperatures than epoxy resins, blending a rubber in an epoxy resin has been observed to reduce the modulus and glass transition temperature of the epoxy resin, making it difficult to strike a balance between toughness and modulus. As thermosetting resin-based methods to dramatically improve the toughness of an epoxy resin, the blending in of a styrene-butadiene-methyl methacrylate copolymer and that of a butadiene-methyl methacrylate block copolymer have been proposed (patent documents 2 and 3). However, these methods are problematic in that they are associated with a reduction in processability due to reduced heat resistance or increased viscosity and a reduction in quality due to the formation of voids and the like. Moreover, the levels of modulus they have managed to produce are not quite satisfactory.

As a method to improve the balance between the modulus and toughness, the combining of a diglycidyl ether-type epoxy resin with a specific number average molecular weight, on the one hand, and an epoxy resin whose SP value differs from the epoxy resin over a certain range, on the other, has been disclosed (patent document 4). However, this method is also unsatisfactory as it is not only inadequate in terms of the balance between the modulus and toughness but also has a tendency to increase viscosity.

PRIOR ART DOCUMENTS

Patent Documents

Patent document 1: Japanese Published Unexamined Application (Tokkai) No. SHO 62-1717
Patent document 2: International Publication WO 2006/077153
Patent document 3: Published Japanese Translation of PCT International Publication JP 2003-535181
Patent document 4: International Publication WO 2009/107697

SUMMARY OF THE INVENTION

Problems to be Solved by the Invention

The present invention aims to provide low-viscosity epoxy resin compositions that are excellent in impregnating reinforcing fibers and capable of producing cured resins with excellent moduli of elasticity and toughness, as well as prepregs and fiber-reinforced composite materials based on those epoxy resin compositions, by overcoming the limitations of conventional techniques. Here, a cured resin means a product that can be obtained by curing an epoxy resin or epoxy resin composition, the same applying hereinafter.

Means of Solving the Problems

As a result of intensive studies aimed at solving the problems, the inventors have completed the present invention by discovering epoxy resin compositions with the constitutions described below. Namely, the present invention is as follows:

An epoxy resin composition containing an epoxy resin [A1], epoxy resin [B1], epoxy resin [C1] and curing agent [D], wherein [A1] is a bisphenol-type epoxy resin with a softening point of 90° C. or more, [B1] is a tri- or higher functional amine-type epoxy resin, [C1] is a bisphenol F-type epoxy resin with a number average molecular weight of 450 or less, and the epoxy resins [A1] to [C1] have the following contents per 100 parts by mass of total epoxy resin content: [A1] 20 to 50 parts by mass, [B1] 30 to 50 parts by mass and [C1] 10 to 40 parts by mass.

(2) An epoxy resin composition containing an epoxy resin [A2], epoxy resin [B2], epoxy resin [C2] and curing agent [D] and satisfying the conditions (1) to (4) below:

According to another embodiment of the invention, the SP value of the cured resin [B2'], obtained by having the epoxy resin [B2] react with the curing agent [D] and curing it, is larger than the SP value of each of the cured resin [A2'] and [C2'], obtained by, respectively, having each of the epoxy resin [A2] and [C2] react with the curing agent [D] and curing it, by at least 1.2;

(2) The softening point of the epoxy resin [A2] is 90° C. or more and the softening points of the epoxy resin [B2] and [C2] are both 50° C. or less;

(3) The modulus of the cured resin obtained by having an epoxy resin composition containing the epoxy resin [C2], dicyandiamide containing active hydrogen groups quantified at 0.9 equivalent relative to the epoxy groups contained in the epoxy resin [C2], and 2 parts by mass of 3-(3,4-dichlorophenyl)-1,1-dimethylurea per 100 parts by mass of the epoxy resin [C2] undergo a reaction at 130° C. for 90 minutes after raising its temperature from room temperature to 130° C. at a rate of 2.5° C./min is 3.5 GPa or more;

(4) The cured resin obtained by curing the epoxy resin composition has a phase separation structure involving an [A2]-rich phase and a [B2]-rich phase with a phase separation structural period of 1 nm to 1 µm.

The present invention also includes prepregs containing the epoxy resin compositions and reinforcing fibers.

The present invention also includes fiber-reinforced composite materials obtained by curing such prepregs.

The present invention also includes fiber-reinforced composite materials containing cured products of said epoxy resin compositions and reinforcing fibers.

Advantageous Effect of the Invention

The present invention makes it possible to realize the formation of a fine phase separation structure of epoxy resins during the curing time, give cured resins with high modulus and high toughness, and provide low-viscosity epoxy resin compositions excellent in impregnating reinforcing fibers. In addition, fiber-reinforced composite materials based on epoxy resin compositions of the present invention as their matrix resins have both excellent static strength characteristics and impact resistance.

DESCRIPTION OF EMBODIMENTS

As a result of intensive studies aimed at achieving the objectives, the inventors have discovered that a cured resin with a high modulus and toughness can be obtained from an epoxy resin composition when it comprises an epoxy resin [A] as a component designed to give high toughness to the cured resin, an epoxy resin [B] as a component designed to give a high modulus to the cured resin, an epoxy resin [C] as a component designed to function as a compatibilizer for the epoxy resins [A] and [B] and a curing agent [D] and when the obtained cured resin forms a fine phase separation structure involving a phase rich with the epoxy resin [A] and another phase rich with the epoxy resin [B].

Here, even if the epoxy resins [A] to [C] have uniformly dissolved into each other prior to curing, it is preferable that they undergo spinodal decomposition during the curing process to form a phase separation structure involving a phase rich with the epoxy resin [A] and another phase rich with the epoxy resin [B]. It is more preferable that such a phase separation structure has a phase separation structural period of 1 nm to 5 µm, most preferably 1 nm to 1 µm. The epoxy resin [C] functions as a compatibilizer for the epoxy resins [A] and [B] during the epoxy resin composition curing process.

If the structural period falls below 1 nm, there is no appreciable cavitation effect, leading to inadequate toughness and a tendency towards an inadequate modulus. If the structural period exceeds 5 µm, there is again no appreciable cavitation effect due to the failure of microscopic cracks developing beyond the sea phase into an island phase as a result of too large a structural period, and this sometimes leads to inadequate toughness in the cured resin. Namely, a high modulus and toughness are compatible in the cured product of an epoxy resin composition only if it involves a phase rich with the epoxy resin [A] and another phase rich with the epoxy resin [B] and forms a fine phase separation structure.

Under the present invention, the phase separation structure means a structure in which two or more phases, including, for instance, a phase rich with the epoxy resin [A] and another phase rich with the epoxy resin [B], have separately formed. Here, a phase rich with the epoxy resin [A] and another phase rich with the epoxy resin [B] respectively mean a phase dominated by the epoxy resin [A] as its primary component and another phase dominated by the epoxy resin [B] as its primary component. Here, the primary component means a component contained in the highest concentration in a given area of a given phase. The phase separation structure may also be a triple or higher phase separation structure involving phases dominated by components other than the epoxy resin [A] or epoxy resin [B]. If, on the other hand, all the components are uniformly mixed at the molecular level, they are said to be in a mutually dissolved state.

The phase separation structure of a cured resin may be evaluated by, for instance, observing its cross section with a scanning electron microscope or transmission electron microscope. Osmium staining may also be used, as necessary. Staining may be performed by the usual method.

Under the present invention, the structural period of phase separation is defined as follows: Since there are two types of phase separation structure, a sea-island structure and a phase continuous structure, definitions are provided for both types. If the phase separation structure is a phase continuous structure, three straight lines of a predetermined length are randomly drawn on a microscopic photograph, and intersections between these straight lines and phase interfaces are located. Distances between adjacent intersections are then measured, with their number average defined as the phase separation structural period. On the basis of a microscopic photograph, such a predetermined length is set as follows: If the structural period is expected to be in the order of 0.01 µm (0.01 µm or more and less than 0.1 µm), the predetermined length is the length of a 20 mm-long straight line drawn on a photograph taken at a magnification of ×20,000 (1 µm on the specimen). Similarly, if the structural period is expected to be in the order of 0.1 µm (0.1 µm or more and less than 1 μm), the predetermined length is the length of a 20 mm-long straight line drawn on a photograph taken at a magnification of ×2000 (10 μm on the specimen), while, if the structural period is expected to be in the order of 1 μm (1 μm or more and less than 10 μm), the predetermined length is the length of a 20 mm-long straight line drawn on a photograph taken at a magnification of ×200 (100 μm on the specimen). If the measured phase separation structural period falls outside the expected range, a repeat measurement is made at a magnification that corresponds to the actual structural period.

If the phase separation structure is a sea-island structure, three regions of a predetermined size are randomly selected on a microscopic photograph, and the sizes of island phase areas present in those regions are measured, with their number average defined as the phase separation structural period. The size of an island phase area is defined as the length of the shortest straight line drawn from a point on one side of the phase interface to another point on the other side of the phase interface through the island. This applies regardless of whether the island phase is an ellipse, random shape or two or more nested circles or ellipses. The predetermined size of a randomly selected region is set as follows: If the structural period is expected to be in the order of 0.01 μm (0.01 μm or more and less than 0.1 μm), the predetermined size is the size of a 4 mm-square region drawn on a photograph taken at a magnification of ×20,000 (0.2 μm on the specimen). Similarly, if the structural period is expected to be in the order of 0.1 μm (0.1 μm or more and less than 1 μm), the predetermined size is the size of a 4 mm-square region drawn on a photograph taken at a magnification of ×2000 (2 μm on the specimen), while, if the structural period is expected to be in the order of 1 μ(1 μm or more and less than 10 μm), the predetermined size is the size of a 4 mm-square region drawn on a photograph taken at a magnification of ×200 (20 μm on the specimen). If the measured phase separation structural period falls outside the expected range, a repeat measurement is made at a magnification that corresponds to the actual structural period.

Next, concrete embodiments of the present invention are described. The first mode of embodiment of an epoxy resin composition of the present invention is an epoxy resin composition containing an epoxy resin [A1], epoxy resin [B1], epoxy resin [C1] and curing agent [D], wherein [A1] is a bisphenol-type epoxy resin with a softening point of 90° C. or more, [B1] is a tri- or higher functional amine-type epoxy resin, [C1] is a bisphenol F-type epoxy resin with a number average molecular weight of 450 or less, and the epoxy resins [A1] to [C1] have the following contents per 100 parts by mass of total epoxy resin content: [A1] 20 to 50 parts by mass, [B1] 30 to 50 parts by mass and [C1] 10 to 40 parts by mass.

In this mode of embodiment, the epoxy resin [A1] needs to contain a bisphenol-type epoxy resin with a softening point of 90° C. or more by the amount of 20 to 50 parts by mass per 100 parts by mass of total epoxy resin content, preferably by 30 to 50 parts by mass per 100 parts by mass of total epoxy resin content. If the softening point of the epoxy resin [A1] is below 90° C., the cured resin has inadequate toughness. If the blending amount of the epoxy resin [A1] falls below 20 parts by mass, the cured resin has inadequate toughness. If the blending amount of the epoxy resin [A1] exceeds 50 parts by mass, an inadequate modulus and heat resistance in the cured resin, as well as too high a viscosity in the epoxy resin composition, result. If the viscosity of the epoxy resin composition is too high, reinforcing fibers cannot be adequately impregnated with the epoxy resin composition during the manufacture of prepregs, leading to the formation of voids in fiber-reinforced composite materials and a reduction in their strength.

As the epoxy resin [A1], any epoxy resin selected from, among other things, a bisphenol A-type epoxy resin, bisphenol F-type epoxy resin, bisphenol AD-type epoxy resin, bisphenol S-type epoxy resin, and a halogen substitution product, alkyl substitution product or hydrogenated product thereof may be preferably used. Commercial products of the epoxy resin [A1] include jER (registered trademark) 1004AF, 1007, 1009P, 1010P, 4005P, 4007P, 4009P and 4010P (all manufactured by Mitsubishi Chemical Corporation). Of the above epoxy resins, a bisphenol A-type epoxy resin and bisphenol F-type epoxy resin are particularly preferred because of their well-balanced heat resistance, modulus and toughness characteristics, with a bisphenol F-type epoxy resin preferred most.

In this mode of embodiment, a tri- or higher functional amine-type epoxy resin needs to be contained by the amount of 30 to 50 parts by mass per 100 parts by mass of total epoxy resin content as an epoxy resin [B1]. If the blending amount of the epoxy resin [B1] falls below 30 parts by mass, the cured resin has an inadequate modulus. If the blending amount of the epoxy resin [B1] exceeds 50 parts by mass, the cured resin has an inadequate plastic deformation capacity and toughness. Of all tri- or higher functional amine-type epoxy resins, a trifunctional amine-type epoxy resin is preferable because of its ability to give well-balanced modulus and toughness characteristics to the cured resin. Of all trifunctional amine-type epoxy resins, an aminophenol-type epoxy resin is particularly preferred because of the relatively high toughness of the cured resin.

As the epoxy resin [B1], any epoxy resin selected from, among other things, an amine-type epoxy resin, such as tetraglycidyl diaminodiphenyl methane, tetraglycidyl diaminodiphenyl sulfone, tetraglycidyl diaminodiphenyl ether, triglycidyl aminophenol, triglycidyl aminocresol, or tetraglycidyl xylylene diamine, an epoxy resin with a triglycidyl isocyanurate backbone, and a halogen substitution product, alkyl substitution product or hydrogenated product thereof may be preferably used.

Commercially available products of the tetraglycidyl diaminodiphenyl methane include Sumiepoxy (registered trademark) ELM434 (manufactured by Sumitomo Chemical Co., Ltd.), YH434L (Nippon Steel Chemical Co., Ltd.), jER (registered trademark) 604 (manufactured by Mitsubishi Chemical Corporation), and Araldite (registered trademark) MY720 and MY721 (both manufactured by Huntsman Advanced Materials Gmbh). Commercially available products of tetraglycidyl diaminodiphenyl ether include 3,3'-TGDDE (manufactured by Toray Fine Chemicals Co., Ltd.). Commercially available products of triglycidyl aminophenol or triglycidyl aminocresol include Araldite (registered trademark) MY0500, MY0510 and MY0600 (all manufactured by Huntsman Advanced Materials Gmbh), and jER (registered trademark) 630 (manufactured by Mitsubishi Chemical Corporation). Commercially available products of tetraglycidyl xylylene diamine and hydrogenated products thereof include TETRAD (registered trademark) -X and TETRAD (registered trademark) -C (both manufactured by Mitsubishi Gas Chemical Co., Inc.). Commercially available products of tetraglycidyl diaminodiphenyl sulfone include TG3DAS (Konishi Chemical Ind. Co., Ltd.).

In this mode of embodiment, it is necessary to use 10 to 40 parts by mass per 100 parts by mass of total epoxy resin content of a bisphenol F-type epoxy resin with a number average molecular weight of 450 or less as the epoxy resin

[C1] to provide a high modulus. Preferably, the epoxy resin [C1] is contained by the amount of 20 to 40 parts by mass per 100 parts by mass of total epoxy resin content. If the blending amount of the epoxy resin [C1] exceeds 40 parts by mass, the cured resin obtained tends to have inadequate toughness. If the blending amount of the epoxy resin [C1] falls below 10 parts by mass, the viscosity of the epoxy resin composition sometime becomes high. Setting the number average molecular weight of the epoxy resin [C1] at 450 or less makes it possible to ensure a low viscosity in the epoxy resin composition obtained. This, in turn, makes it possible to increase the fiber content of the prepreg obtained by facilitating the impregnation of fibers with the epoxy resin composition during the prepreg manufacturing process. If, on the other hand, the number average molecular weight of the epoxy resin [C1] is larger than 450, the viscosity of the epoxy resin composition tends to become high, and this, in turn, tends to keep the fiber content of the prepreg from improving by making the impregnation of fibers with the epoxy resin composition difficult during the prepreg manufacturing process. Setting the number average molecular weight of the epoxy resin [C1] at 450 or less also facilitates the formation of a fine phase separation structure by increasing the effectiveness of [C1] as a compatibilizer. If the number average molecular weight of the bisphenol F-type epoxy resin [C1] is larger than 450, the component [C1] tends to become less effective as a compatibilizer by becoming more compatible with one phase than the other. This, in turn, gives rise to a tendency for the phase separation structural period of the cured resin to be large.

Under the present invention, the number average molecular weight means the value obtained by first dissolving the epoxy resin to be measured in tetrahydrofuran (THF), then carrying out a measurement using a gel permeation chromatography (GPC), and finally subjecting the measurement result to a polystyrene conversion. Measurement conditions are to be described in detail later.

There are no specific limitations or restrictions on the choice of a compound as the curing agent [D], as long as it can cure an epoxy resin. Examples include amines, such as aromatic amines compound or alicyclic amines, anhydrides, polyaminoamides, organic acid hydrazides and isocyanates.

Amine curing agents are preferable because they enable the obtained cured resins to have excellent mechanical characteristics and heat resistance. Common amine curing agents include diaminodiphenyl sulfone and diaminodiphenyl methane (aromatic amines); dicyandiamide and derivatives thereof (aliphatic amine); and hydrazide compounds. Commercial products of dicyandiamide include DICY-7 and DICY-15 (both manufactured by Mitsubishi Chemical Corporation). Dicyandiamide derivatives are obtained by bonding various compounds to dicyandiamide as, for instance, a reaction product with an epoxy resin and a reaction product with a vinyl compound or acrylic compound.

Moreover, it is preferable to blend dicyandiamide or a derivative thereof in powder form into an epoxy resin composition as the curing agent [D] from the viewpoint of room-temperature storage stability and viscosity stability during prepreg production. In the case of blending a powder form of dicyandiamide or a derivative thereof into a resin, its average particle diameter is preferably 10 μm or less, more preferably 7 μm or less. Notably, a powder form of dicyandiamide or a derivative thereof with an average particle diameter of more than 10 μm sometimes fails to penetrate reinforcing fiber bundles, ending up being left on their surface, during the application of heat and pressure to impregnate reinforcing fiber bundles with the epoxy resin composition as part of the prepreg manufacturing process.

It is preferable that the total amount of the curing agent [D] be such that the active hydrogen groups contained in it are in the range of 0.6 to 1.0, more preferably 0.7 to 0.9, equivalent of epoxy groups belonging to all the epoxy components contained in the epoxy resin composition. If the active hydrogen groups fall below 0.6 equivalent, the cured resin has an inadequate reaction rate, and the glass transition temperature and strength of the fiber-reinforced composite material obtained are sometimes inadequate. If the active hydrogen groups exceed 1.0 equivalent, the cured resin has an inadequate plastic deformation capacity, though its reaction rate, glass transition temperature and modulus are sufficient, and this sometimes leads to inadequate impact resistance in the fiber-reinforced composite material obtained.

Each curing agent may be used in combination with a curing accelerator or some other epoxy resin curing agent. Examples of a curing accelerator to combine with include ureas, imidazoles, any derivative thereof and Lewis acid catalysts.

Examples of such a urea compound include N,N-dimethyl-N'-(3,4-dichlorophenyl) urea, toluene bis(dimethylurea), 4,4'-methylene bis (phenyl dimethylurea), and 3-phenyl-1,1-dimethylurea. Commercial products of such a urea compound include DCMU99 (manufactured by Hodogaya Chemical Co., Ltd.), and Omicure (registered trademark) 24, 52 and 94 (all manufactured by CVC Specialty Chemicals, Inc.).

Commercial products of an imidazole compound or derivative thereof include 2MZ, 2PZ and 2E4MZ (all manufactured by Shikoku Chemicals Corporation). Examples of a Lewis acid catalyst include complexes of a boron trihalide and a base, such as a boron trifluoride piperidine complex, boron trifluoride monoethyl amine complex, boron trifluoride triethanol amine complex, and boron trichloride octyl amine complex.

Of these choices, a urea compound is preferably used from the viewpoint of the balance between storage stability and catalytic ability. The blending amount of such a urea compound is preferably 1 to 3 parts by mass per 100 parts by mass of all epoxy resin components contained in the epoxy resin composition. If the blending amount of a urea compound falls below 1 part by mass, the reaction fails to progress far enough, leading to a reduced modulus and heat resistance in the cured resin. If the blending amount of a urea compound exceeds 3 parts by mass, the self-polymerization reaction of epoxy resins impedes the reaction between epoxy resins and the curing agent, leading to reduced toughness, as well as a reduced modulus, in the cured resin.

A second embodiment of the epoxy resin composition of the present invention is an epoxy resin composition containing an epoxy resin [A2], epoxy resin [B2], epoxy resin [C2] and curing agent [D] that satisfies the conditions (1) to (4) below:
(1) The SP value of the cured resin [B2'], obtained by curing the epoxy resin [B2] through a reaction with the curing agent [D], is greater than the SP values of the cured resins [A2'] and [C2'], obtained, respectively, by curing the epoxy resins [A2] and [C2] through a reaction with the curing agent [D], by 1.2;
(2) The softening point of the epoxy resin [A2] is 90° C. or more, while the softening points of the epoxy resins [B2] and [C2] are both 50° C. or less;
(3) The modulus of the cured resin obtained by having an epoxy resin composition comprising the epoxy resin [C2], dicyandiamide that contains active hydrogen groups quantified at 0.9 equivalent relative to the epoxy groups contained in the epoxy resin [C2], and 2 parts by mass of 3-(3,4-dichlorophenyl)-1,1-dimethylurea (hereinafter referred to as DCMU) per parts by mass of the epoxy resin [C2] undergo a reaction at 130° C. for 90 minutes after raising its temperature from room temperature to 130° C. at a rate of 2.5° C./min is 3.5 GPa or more;

(4) The cured resin obtained by curing the epoxy resins [A2] to [C2] through a reaction with the curing agent [D] has a phase separation structure involving an [A2]-rich phase and a [B2]-rich phase with a phase separation structural period of 1 nm to 1 μm In this embodiment, the SP values of the cured resin [A2'], [B2'], and [C2'], obtained, respectively, by having the epoxy resin [A2], [B2], and [C2] react with the curing agent [D], need to satisfy the following conditions:

$$\text{SP value of } [B2'] \geq \text{SP value of } [A2'] + 1.2 \quad (1)$$

$$\text{SP value of } [B2'] \geq \text{SP value of } [C2'] + 1.2 \quad (2)$$

Here, SP stands for solubility parameter, which is a well-known index of solubility. SP values as defined under the present invention are values calculated from molecular structures on the basis of the Fedors method, described in Polym. Eng. Sci., 14(2), 147-154 (1974). If the SP value of [B2'] is smaller than the sum of the SP value of [A2'] and 1.2, [A2] and [B2] end up dissolving into each other in the cured resin obtained, leading to an inadequate modulus and toughness in the cured resin due to the formation of a uniform structure. Similarly, if the SP value of [B2'] is smaller than the sum of the SP value of [C2'] and 1.2, the compatibilizer [C2] ends up dissolving only into [B2] in the cured resin obtained, leading to coarse phase separation between the [A2]-rich phase and [B2]-rich phase.

In this mode of embodiment, it is necessary that the softening point of the epoxy resin [A2] be 90° C. or more and that the softening points of the epoxy resins [B2] and [C2] be 50° C. or less. As long as the epoxy resins [A2] to [C2] meet these requirements, the formation of a uniform structure in the cured resin obtained as a result of the dissolution of [A2] and [B2] into each other can be prevented, leading to an improvement in both the modulus and toughness.

In this mode of embodiment, the modulus of the cured resin obtained by having an epoxy resin composition comprising the epoxy resin [C2], dicyandiamide that contains active hydrogen groups quantified at 0.9 equivalent of the epoxy groups contained in the epoxy resin [C2] and 2 parts by mass of DCMU per 100 parts by mass of the epoxy resin [C2] undergo a reaction at 130° C. for 90 minutes after raising its temperature from room temperature to 130° C. at a rate of 2.5° C./min is 3.5 GPa or more. If the modulus of this particular cured resin is less than 3.5 GPa, cured resins obtained from epoxy resin compositions of the present invention cannot have a good modulus. Since the epoxy resin [C2] is a component that dissolves into both the [A2]-rich phase and the [B2]-rich phase by acting as a compatibilizer, a high modulus in the epoxy resin [C2] leads to a high modulus in the cured resin obtained. In particular, if the phase separation structure is a sea-island structure, it is important that the modulus of the sea phase that surrounds the island phase be high, so that there is a great benefit in the epoxy resin [C2] dissolving into the sea phase and causing its modulus to increase. Here, an active hydrogen group means a functional group that is capable of reacting with an epoxy group. Examples of an active hydrogen group include an amino group and hydroxyl group.

In this mode of embodiment, the cured resin obtained by curing an epoxy resin composition needs to have a phase separation structure involving a phase rich with the epoxy resin [A2] and another phase rich with the epoxy resin [B2] with a phase separation structural period of 1 nm to 1 μm.

The modulus and toughness are compatible in a cured resin only if the cured resin has a fine phase separation structure. If the structural period is less than 1 nm, there is no appreciable cavitation effect, resulting in inadequate toughness, as well as an inadequate modulus. If the structural period exceeds 1 μm, there is again no appreciable cavitation effect due to the failure of microscopic cracks developing beyond the sea phase into an island phase as a result of too large a structural period, leading to inadequate toughness.

As the epoxy resin [A2], any epoxy resin with a softening point of 90° C. or more selected from, among other things, a bisphenol-type epoxy resin, isocyanate-modified-type epoxy resin, anthracene-type epoxy resin, and a halogen substitution product, alkyl substitution product or hydrogenated product thereof may preferably be used.

Commercial products of an epoxy resin [A2] include jER (registered trademark) 1004AF, 1007, 1009P, 1010P, 4005P, 4007P, 4009P and 4010P (all manufactured by Mitsubishi Chemical Corporation) in terms of a bisphenol-type epoxy resin and XAC4151 (manufactured by Asahi Kasei Chemicals Corporation) in terms of an isocyanate-modified epoxy resin.

Because of its ability to give high toughness to the cured resin, it is preferable to use a bisphenol-type epoxy resin with a softening point of 90° C. or more as the epoxy resin [A2]. In this regard, a bisphenol A-type epoxy resin and bisphenol F-type epoxy resin are particularly preferred because of their well-balanced heat resistance, modulus and toughness characteristics, with a bisphenol F-type epoxy resin preferred most for its ability to provide a high modulus. It is preferable that the epoxy resin [A2] be contained by the amount of 20 to 50 parts by mass, more preferably by 30 to 50 parts by mass, per 100 parts by mass of total epoxy resin content. If the blending amount falls below 20 parts by mass, the cured resin obtained tends to have reduced toughness due to a difficulty in forming a phase separation structure. If the blending amount exceeds 50 parts by mass the cured resin tends to have a reduced modulus and heat resistance, combined with a tendency for the epoxy resin composition to have a high viscosity. If the viscosity of an epoxy resin composition is too high, reinforcing fibers cannot sometimes be adequately impregnated with the epoxy resin composition during the manufacture of prepregs. This may lead to the formation of voids in fiber-reinforced composite materials and a reduction in their strength.

As the epoxy resin [B2], any epoxy resin with a softening point of 50° C. or less selected from, among other things, an amine-type epoxy resin, such as tetraglycidyl diaminodiphenyl methane, tetraglycidyl diaminodiphenyl ether, triglycidyl aminophenol, triglycidyl aminocresol or tetraglycidyl xylylene diamine, an epoxy resin with a triglycidyl isocyanurate backbone, and a halogen substitution product, alkyl substitution product or hydrogenated product thereof may be used.

Commercially available products of the tetraglycidyl diaminodiphenyl methane include Sumiepoxy (registered trademark) ELM434 (manufactured by Sumitomo Chemical Co., Ltd.), YH434L (Nippon Steel Chemical Co., Ltd.), jER (registered trademark) 604 (manufactured by Mitsubishi Chemical Corporation), and Araldite (registered trademark) MY720 and MY721 (manufactured by Huntsman Advanced Materials Gmbh). Commercially available products of tetraglycidyl diaminodiphenyl ether include 3,3'-TGDDE (manufactured by Toray Fine Chemicals Co., Ltd.). Commercially available products of triglycidyl aminophenol or triglycidyl aminocresol include Araldite (registered trademark) MY0500, MY0510 and MY0600 (manufactured by Huntsman Advanced Materials Gmbh) and jER (registered trademark) 630 (manufactured by Mitsubishi Chemical Corporation). Commercially available products of tetraglycidyl xylylene diamine and a hydrogenated product thereof include TETRAD (registered trademark) -X and TETRAD (registered trademark)-C (manufactured by Mitsubishi Gas Chemical Co., Inc.). Commercially available products of an epoxy resin with a triglycidyl isocyanurate backbone include TEPIC (registered trademark) B26 (manufactured by Nissan Chemical Industries, Ltd.).

As the epoxy resin [B2], a tri- or higher functional amine-type epoxy resin is preferable. The epoxy resin [B2] is preferably contained by the amount of 30 to 50 parts by mass per 100 parts by mass of total epoxy resin content. If the blending amount falls below 30 parts by mass, the cured resin obtained tends to have a reduced modulus due to a difficulty in forming a phase separation structure. If the blending amount exceeds 50 parts by mass, the cured resin tends to have a reduced plastic deformation capacity and toughness. Of all tri- or higher functional amine-type epoxy resins, a trifunctional amine-type epoxy resin is preferable because of its ability to give well-balanced modulus and toughness characteristics to the cured resin. Of all trifunctional amine-type epoxy resins, an aminophenol-type epoxy resin is particularly preferable because of relatively high toughness in the cured resin.

As the epoxy resin [C2], any epoxy resin with a softening point of 50° C. or less selected from, among other things, a bisphenol F-type epoxy resin, bisphenol AD-type epoxy resin, bisphenol S-type epoxy resin, phenol novolac-type epoxy resin, and a halogen substitution product, alkyl substitution product or hydrogenated product thereof may be used. The commercial products of the epoxy resin [C2] include Epicron (registered trademark) 830 and 806 (manufactured by DIC) and jER (registered trademark) 152 (manufactured by Mitsubishi Chemical Corporation).

As the epoxy resin [C2], a bisphenol F-type epoxy resin with a number average molecular weight of 450 or less is preferable because it provides a high modulus and has good compatibility with the epoxy resins [A2] and [B2]. It is preferable that the epoxy resin [C2] be contained by the amount of 10 to 40 parts by mass, more preferably 20 to 40 parts by mass, per 100 parts by mass of total epoxy resin content. If the blending amount of the epoxy resin [C2] falls below 10 parts by mass, the cured resin obtained tends to have a large phase separation structural period. If the blending amount of the epoxy resin [C2] exceeds 40 parts by mass, the epoxy resin [A2] and [B2] tend to dissolve into each other, leading to a tendency for the cured resin obtained to have a reduced modulus and toughness due to a difficulty in forming a phase separation structure.

Under the present invention, the number average molecular weight means the value obtained by first dissolving the epoxy resin to be measured in tetrahydrofuran (THF), then carrying out a measurement using a gel permeation chromatography (GPC), and finally subjecting the measurement result to a polystyrene conversion. Measurement conditions are to be described in detail later.

Setting the number average molecular weight of the epoxy resin [C2] at 450 or less makes it possible to ensure a low viscosity in the epoxy resin composition obtained. This, in turn, makes it possible to increase the fiber content of the prepreg obtained by facilitating the impregnation of fibers with the epoxy resin composition during the prepreg manufacturing process. If, on the other hand, the number average molecular weight of the epoxy resin [C2] is larger than 450, the viscosity of the epoxy resin composition tends to become high, and this tends to keep the fiber content of the prepreg from improving by making the impregnation of fibers with the epoxy resin composition difficult during the prepreg manufacturing process. Setting the number average molecular weight of the epoxy resin [C2] at 450 or less also facilitates the formation of a fine phase separation structure by increasing the effectiveness of [C2] as a compatibilizer. If the number average molecular weight of the bisphenol F-type epoxy resin [C2] is larger than 450, the component [C2] tends to become less effective as a compatibilizer by becoming more compatible with one phase than the other. This, in turn, gives rise to a tendency for the phase separation structural period of the cured resin to be large.

Commercial products of a bisphenol F-type epoxy resin with a number average molecular weight of 450 or less include Epicron (registered trademark) 830 and 806 (both manufactured by DIC).

The curing agent [D] is the same as the curing agent [D] as described in the first mode of embodiment.

Next, other components are described. An epoxy resin composition of the present invention, to the extent that it does not impair the Advantageous Effect of the Invention, allows the addition of one or more epoxy resins other than the epoxy resin [A] to [C] for the purpose of controlling viscoelasticity and thereby improving the ease of handling or the modulus and heat resistance of the cured resin. Examples of such epoxy resins include a phenol novolac-type epoxy resin, cresol novolac epoxy resin, resorcinol-type epoxy resin, phenol aralkyl-type epoxy resin, dicyclopentadiene-type epoxy resin, an epoxy resin with a biphenyl backbone, isocyanate-modified epoxy resin, anthracene-type epoxy resin, polyethylene glycol-type epoxy resin, N,N'-diglycidyl aniline, and liquid bisphenol A-type epoxy resin.

Commercial products of phenol novolac-type epoxy resin include Epikote (registered trademark) 152 and 154 (both manufactured by Mitsubishi Chemical Corporation) and Epicron (registered trademark) N-740, N-770 and N-775 (all manufactured by DIC).

Commercial products of a cresol novolac-type epoxy resin include Epicron (registered trademark) N-660, N-665, N-670, N-673 and N-695 (all manufactured by DIC) and EOCN (registered trademark) 1020, 102S and 104S (all manufactured by Nippon Kayaku Co., Ltd.).

Concrete examples of a resorcinol-type epoxy resin include Denacol (registered trademark) EX-201 (manufactured by Nagase ChemteX Corporation).

Commercial products of a dicyclopentadiene-type epoxy resin include Epicron (registered trademark) HP7200, HP7200L and HP7200H (all manufactured by DIC), TACTIX (registered trademark) 558 (manufactured by Huntsman Advanced Materials Gmbh), and XD-1000-1L and XD-1000-2L (both manufactured by Nippon Kayaku Co., Ltd.).

Commercial products of an epoxy resin with a biphenyl backbone include Epikote (registered trademark) YX4000H, YX4000 and YL6616 (all manufactured by Mitsubishi Chemical Corporation) and NC-3000 (manufactured by Nippon Kayaku Co., Ltd.).

Commercial products of an isocyanate-modified epoxy resin include oxazolidone ring-containing AER (registered trademark) 4152 (manufactured by Asahi Kasei E-materials Corp.) and XAC4151 (manufactured by Asahi Kasei Chemicals Corporation).

Commercial products of an anthracene-type epoxy resin include YX8800 (manufactured by Mitsubishi Chemical Corporation).

Commercial products of a polyethylene glycol-type epoxy resin include Denacol (registered trademark) EX810, 811, 850, 851, 821, 830, 841 and 861 (manufactured by Nagase ChemteX Corporation).

Commercial products of N,N'-diglycidyl aniline include GAN (manufactured by Nippon Kayaku Co., Ltd.).

Commercial products of a liquid bisphenol A-type epoxy resin include jER (registered trademark) 828 (manufactured by Mitsubishi Chemical Corporation).

An epoxy resin composition of the present invention allows the blending of a thermoplastic resin soluble in an epoxy resin, organic particles (e.g. rubber particles and thermoplastic resin particles), inorganic particles, and other ingredients into epoxy resins so as to improve the tackiness and drapability of the prepreg through viscoelasticity control and improve the impact resistance and other mechanical characteristics of the fiber-reinforced composite material.

As a thermoplastic resin soluble in an epoxy resin, a thermoplastic resin having a hydrogen-bonding functional group is preferably used because of its expected bonding improvement effect between the resin and the reinforcing fibers. Examples of a hydrogen-bonding functional group include an alcoholic hydroxyl group, amide bond, sulfonyl group, and carboxyl group.

Concrete examples of a thermoplastic resin having an alcohol hydroxyl group include a polyvinyl acetal resin, such as polyvinyl formal and polyvinyl butyral, polyvinyl alcohol, and phenoxy resin. Concrete examples of thermoplastic resin having an amide bond include polyamide, polyimide, polyamide-imide, and polyvinyl pyrrolidone. Concrete examples of a thermoplastic resin having a sulfonyl group include polysulfone. Polyamide, polyimide and polysulfone may have a functional group, such as an ether bond or carbonyl group, on their backbone chains. Polyamide may have a substituent group on the nitrogen atom as its amide group. Examples of a thermoplastic resin having a carboxyl group include polyester, polyamide and polyamide-imide.

Commercial products of a thermoplastic resin soluble in an epoxy resin and having a hydrogen-bond functional group include Denka Butyral in terms of a polyvinyl acetal resin; Denka Poval (registered trademark) (Denki Kagaku Kogyo K.K.) and Vinylec (registered trademark) (manufactured by JNC Corp.) in terms of a polyvinyl alcohol resin; Macromelt (registered trademark) (manufactured by Henkel Hakusui Corporation), and Amilan (registered trademark) CM4000 (manufactured by Toray Industries, Inc.) in terms of a polyamide resin; Ultem (registered trademark) (SABIC Innovative Plastics), AURUM (registered trademark) (manufactured by Mitsui Chemicals, Inc.), and Vespel (registered trademark) (manufactured by Du Pont) in terms of polyimide; Victrex (registered trademark) (manufactured by Victrex plc) in terms of a PEEK polymer; UDEL (registered trademark) (manufactured by Solvay Advanced Polymers, LLC) in terms of polysulfone; and Luviskol (registered trademark) (manufactured by BASF Japan Ltd.) in terms of polyvinyl pyrolidone.

Acrylic resins are advantageously used for viscoelasticity control because of their high compatibility with epoxy resins. Commercial products of an acrylic resin include Dianal (registered trademark) BR series (manufactured by Mitsubishi Rayon Co., Ltd.), and Matsumoto Microsphere (registered trademark) M, M100 and M500 (manufactured by Matsumoto Yushi-Seiyaku Co., Ltd.).

As rubber particles, crosslinked rubber particles and core-shell rubber particles, produced by growing a dissimilar polymer on the surface of crosslinked rubber particles through graft polymerization, are advantageously used from the viewpoint of ease of handling, etc.

Commercially available products of core-shell rubber particles include Paraloid (registered trademark) EXL-2655, EXL-2611 and EXL-3387 (manufactured by Rohm and Haas Company), which comprise a copolymerization product of butadiene, methacrylic acid alkyl and styrene, and Stafiloid (registered trademark) AC-3355 and TR-2122 (manufactured by Ganz Chemical Co., Ltd.), which comprise a copolymerization product of acrylate and methacrylate, NANOSTRENGTH (registered trademark) M22, 51, 52 and 53 (manufactured by Arkema K.K.), and Kane Ace (registered trademark) MX Series (Kaneka Corporation).

As thermoplastic resin particles, polyamide particles and polyimide particles are advantageously used. Commercially available products of polyamide particles include SP-500 (manufactured by Toray Industries, Inc.) and Orgasol (registered trademark) (manufactured by Arkema K.K.).

Under the present invention, it is effective to contain at least one type of block copolymer selected from a set comprising S-B-M, B-M and M-B-M [E] (hereinafter also referred to simply as the block copolymer [E]) to improve toughness and impact resistance while maintaining the excellent heat resistance of the epoxy resin composition.

Here, each of the letters S, B and, M denotes a block defined as follows: Each of the blocks S, B and, M is connected to the other directly by means of a covalent bond or via a chemical structure.

It is preferable that any of blocks S, B and M in the case of the block copolymer being of the S-B-M type and either block B or M in the case of the block copolymer being of the B-M or M-B-M type is compatible with epoxy resins from the viewpoint of improving toughness.

Block M comprises a homopolymer of polymethyl methacrylate or a copolymer containing at least 50 mass % of methyl methacrylate. It is preferable that block M comprise syndiotactic PMMA (polymethyl methacrylate) by 60 mass % or more.

Block B is incompatible with block M and has a glass transition temperature of 20° C. or less. The glass transition temperature of block B can be measured using the DMA method based on a dynamic viscoelasticity measuring device (a RSAII manufactured by Rheometrics, Inc. or a rheometer model ARES manufactured by TA Instruments) whether it is the epoxy resin composition as a whole or just the block copolymer [E]. In concrete terms, a plate-shaped specimen measuring 1 mm thick, 2.5 mm wide and 34 mm long is measured by subjecting it to stress at a frequency of 1 Hz while the temperature is swept over the −100 to 250° C. range, with the glass transition temperature found as the temperature at which tan δ becomes maximum. Here, the specimen is prepared in the manner described as follows: When the specimen is an epoxy resin composition, an uncured resin composition is defoamed under vacuum, and then cured at a temperature of 130° C. for 2 hours inside a mold set for a thickness of 1 mm using a 1 mm-thick Teflon (registered trademark) to obtain a void-free plate-shaped cured resin. In the case of a single block copolymer, a similarly void-free plate is prepared using a biaxial extrusion machine. Such a plate is then cut to the size using a diamond cutter and evaluated.

The glass transition temperature of block B needs to be 20° C. or less, preferably 0° C. or less, more preferably −40° C. or less. As far as toughness is concerned, the lower the glass transition temperature, the more preferable, but if it falls below −100° C., problems with processability, such as a rough cutting surface on the fiber-reinforced composite material, may arise.

Block B is preferably an elastomer block. The monomer used to synthesize such an elastomer block may be selected from butadiene, isoprene, 2,3-dimethyl-1,3-butadiene, 1,3-pentadiene, and 2-phenyl-1,3-butadiene.

Block B is preferably a polydiene selected from polybutadiene, polyisoprene, a random copolymer thereof and a fully or partial hydrogenated polydiene from the viewpoint of toughness. Such a fully or partial hydrogenated polydiene may be produced by the usual hydrogenation method. Of all the diener mentioned above, 1,4-polybutadiene (glass transition temperature: approx. −90° C.), which has the lowest glass transition temperature, is preferably used. This is because using a block B with the lowest possible glass transition temperature is advantageous from the viewpoint of impact resistance and toughness.

As the monomer constituting elastomer block B, alkyl (meth)acrylate may also be used. Concrete examples include ethyl acrylate (−24° C.), butyl acrylate (−54° C.), 2-ethylhexyl acrylate (−85° C.), hydroxyethyl acrylate (−15° C.), and 2-ethylhexyl meta-acrylate (−10° C.). Here, the figure shown in brackets following the name of each acrylate is the glass transition temperature of block B when that arylate is used. Of these arylates, it is preferable to use butyl acrylate. Those acrylates are incompatible with a block M acrylate containing at least 50 mass % of methyl methacrylate. Block B more preferably comprises a polymer selected from poly(1,4-butadiene), polybutyl acrylate, and poly(2-ethylhexyl acrylate), with poly(1,4-butadiene) or polybutyl acrylate most preferred.

Block S is incompatible with blocks B and M and has a glass transition temperature higher than that of block B. The glass transition temperature or melting point of block S is preferably 23° C. or more, more preferably 50° C. or more. Block S may be based on, for instance, an aromatic vinyl compound, such as styrene, α-methyl styrene or vinyl toluene, or alkyl ester of (meth)acrylic acid having an alkyl chain containing one to 18 carbon atoms.

The blending amount of the block copolymer [E] is preferably 1 to 10 parts by mass, more preferably 2 to 7, per 100 parts by mass of total epoxy resin content from the viewpoint of mechanical characteristics and compatibility to the composite production process. If the blending amount falls below 1 part by mass, there is only a small toughness and plastic deformation capacity improvement effect on the cured resin, sometimes leading to a low impact resistance of the fiber-reinforced composite material obtained. If the blending amount exceeds 10 parts by mass, the modulus of the cured resin falls, leading to a reduction in the mechanical characteristics of the fiber-reinforced composite material, combined with a reduction in the ease of handling of the epoxy resin composition due to high viscosity.

When using an M-B-M triblock copolymer as the block copolymer [E], the two block Ms in the M-B-M triblock copolymer may be identical or different. They may also be based on the same monomer but with different molecular weights.

When using an M-B-M triblock copolymer and B-M diblock copolymer in combination as the block copolymer [E], block Ms in the M-B-M triblock copolymer and block M in the B-M diblock copolymer may be identical or different, while block B in the M-B-M triblock copolymer and block B in the B-M diblock copolymer may be identical or different.

When using an S-B-M triblock copolymer, B-M diblock copolymer and/or M-B-M triblock copolymer in combination as the block copolymer [E], block M in the S-B-M triblock copolymer, block Ms in the M-B-M triblock copolymer and block M in the B-M diblock copolymer may be identical or different. Similarly, block Bs in the S-B-M triblock copolymer S-B-M, M-B-M triblock copolymer and B-M diblock copolymer may be identical or different.

The block copolymer [E] may be produced through anionic polymerization. For instance, methods described in EuroPatent #EP 524,054, Official Gazette, and EuroPatent #EP 749,987, Official Gazette, may be used for their production.

Concrete examples of an M-B-M triblock copolymer include Nanostrength M22, (manufactured by Arkema K.K), which is a methyl methacrylate-butyl acrylate-methyl methacrylate copolymer, and Nanostrength M22N (manufactured by Arkema K.K), which has a polar functional group. Concrete examples of an S-B-M triblock copolymer include Nanostrength 123, Nanostrength 250, Nanostrength 012, Nanostrength E20, and Nanostrength E40 (all manufactured by Arkema K.K), which are styrene-butadiene-methyl methacrylate copolymers.

In the case of a block copolymer [E] being used, even if the epoxy resins [A] to [C] and the block copolymer [E] have uniformly dissolved into each other prior to curing, they tend to undergo spinodal decomposition during the curing process to form a phase separation structure involving a phase rich with the epoxy resin [A], another phase rich with the epoxy resin [B], and a third phase rich with the block copolymer [E].

An epoxy resin composition comprising the epoxy resins [A2] to [C2], curing agent [D] and block copolymer [E] gives rise to a cured resin with a phase separation structure involving a phase rich with the epoxy resin [A2], another phase rich with the epoxy resin [B2] and a third phase rich with the block copolymer [E], and it is preferable that such a phase separation structure have a phase separation structural period of 1 nm to 1 μm for the phase rich with the epoxy resin [A2], phase rich with the epoxy resin [B2], and phase rich with the block copolymer [E].

It is preferable that an epoxy resin composition comprising the epoxy resins [A1] to [C1], curing agent [D] and block copolymer [E] give rise to a cured resin with a phase separation structure involving a phase rich with the epoxy resin [A1], another phase rich with the epoxy resin [B1] and a third phase rich with the block copolymer [E] with a phase separation structural period of 1 nm to 5 μm, more preferably 1 nm to 1 μm, for the phase rich with the epoxy resin [A1], phase rich with the epoxy resin [B1], and phase rich with the block copolymer [E].

If such a phase separation structural period for the phase rich with the epoxy resin [A] and phase rich with the epoxy resin [B] is too small, one or more of the adjustment methods listed below may be implemented to increase it to the extent that it does not impair the Advantageous Effect of the Invention.

(1) Reduce the content of the epoxy resin [C] to total epoxy resin content.
(2) Raise the softening point of the epoxy resin [A].
(3) Lower the softening point of the epoxy resin [B].
(4) Increase the contents of both the epoxy resin [A] and [B].

Such a phase separation structural period for the phase rich with the epoxy resin [A] and phase rich with the epoxy resin [B] may also be reduced by implementing one or more of the adjustment methods listed below to the extent that it does not impair the Advantageous Effect of the Invention.
(1) Increase the content of the epoxy resin [C] to total epoxy resin content.
(2) Lower the softening point of the epoxy resin [A].
(3) Raise the softening point of the epoxy resin [B].
(4) Reduce the contents of both the epoxy resin [A] and [B].

The phase separation structural period of the phase rich with the block copolymer [E] may be reduced by implementing one or more of the adjustment methods listed below to the extent that it does not impair the Advantageous Effect of the Invention.
(1) Reduce the content of the block copolymer [E].
(2) Lower the softening point of the epoxy resin [A].
(3) Increase the content of the epoxy resin [B].

The phase separation structural period of the phase rich with the block copolymer [E] may also be increased by implementing one or more of the adjustment methods listed below to the extent that it does not impair the Advantageous Effect of the Invention.
(1) Increase the content of the block copolymer [E].
(2) Raise the softening point of the epoxy resin [A].
(3) Reduce the content of the epoxy resin [B].

When an epoxy resin composition of the present invention is used as the matrix resin of a prepreg, its viscosity at 80° C. is preferably 0.5 to 200 Pa·s from the viewpoint of processability, including tackiness and drapability. If the viscosity at 80° C. of an epoxy resin composition falls below 0.5 Pa·s, the prepreg is left with low shape retainability with a possibility of developing cracks. There is also a possibility of unevenness in fiber density occurring due to excessive resin flows during the fiber-reinforced composite material molding process. If the viscosity at 80° C. exceeds 200 Pa·s, it is sometimes not possible to adequately impregnate reinforcing fibers with the epoxy resin composition during the production of a prepreg. This gives rise to a risk of the formation of voids in the fiber-reinforced composite material obtained and a reduction in its strength. The viscosity at 80° C. of an epoxy resin composition is more preferably in the 5 to 50 Pa·s range from the viewpoint of producing prepregs with high fiber content by facilitating the penetration of the resin into inter-fiber spaces during the prepreg manufacturing process. Viscosity may be reduced by implementing one or more of methods (1) to (2) below and increased by implementing one or more of methods (3) to (4) below to the extent that it does not impair the Advantageous Effect of the Invention.
(1) Use an epoxy resin [A] and/or [B] with a low softening point.
(2) Increase the blending amount of the epoxy resin [C].
(3) Use an epoxy resin [A] and/or [B] with a high softening point.
(4) Blend in a thermosetting resin.

Here, viscosity refers to the complex viscoelastic modulus η* as measured at a frequency of 0.5 Hz and a gap length of 1 mm using a dynamic viscoelastic measuring device (a Rheometer RDAII manufactured by Rheometrics, Inc. or rheometer model ARES manufactured by TA Instruments) and circular parallel plates 40 mm in diameter as the temperature is monotonically increased at a rate of 1.5° C./min.

It is preferable that an epoxy resin composition of the present invention produce a cured resin with a modulus of 3.8 to 5.0 GPa, more preferably 4.0 to 5.0 GPa. If the modulus falls below 3.8 GPa, the fiber-reinforced composite material obtained sometimes has low static strength. If the modulus exceeds 5.0 GPa, the fiber-reinforced composite material obtained tends to have a low plastic deformation capacity, and this sometimes results in low impact strength in the fiber-reinforced composite material. The measurement method for the modulus is to be described in detail later.

The modulus of a cured resin may be improved by implementing one or more of the methods listed below to the extent that it does not impair the Advantageous Effect of the Invention.
(1) Use a bisphenol F-type epoxy resin with a high modulus as the epoxy resin [A].
(2) Increase the blending amount of the epoxy resin [B].
(3) Use an amine-type epoxy, especially an aminophenol-type epoxy resin with a high modulus, as the epoxy resin [B].
(4) Use a bisphenol F-type epoxy resin as the epoxy resin [C].

The curing temperature and curing time to obtain a cured resin is selected according to the curing agent and catalyst blended in. In the case of a curing agent combining dicyandiamide and DCMU, for instance, curing conditions comprising a temperature of 130 to 150° C. and a duration of 90 minutes to 2 hours are preferable, while curing conditions comprising a temperature of 180° C. and a duration of 2 to 3 hours are preferable when diaminodiphenyl sulfone is used.

It is preferable that any cured resin obtained by curing an epoxy resin composition of the present invention have a resin toughness of 1.1 MPa·m$^{0.5}$ or more, more preferably, 1.3 MPa·m$^{0.5}$ or more. If resin toughness is less than 1.1 MPa·m$^{0.5}$, the fiber-reinforced composite material obtained sometimes has reduced impact resistance. The measurement method for resin toughness is to be described in detail later.

Resin toughness may be improved by implementing one or more of the methods listed below to the extent that it does not impair the Advantageous Effect of the Invention.
(1) Use an epoxy resin [A] and/or [B] with a large number average molecular weight.
(2) Increase the blending amount of the epoxy resin [A].
(3) Blend in a block copolymer [E].

In the preparation of an epoxy resin composition of the present invention, a kneader, planetary mixer, triple roll mill, twin screw extruder, and the like may advantageously be used. After the epoxy resins [A] to [C] are placed, the mixture is heated to a temperature selected from 130 to 180° C. while being stirred so as to uniformly dissolve the epoxy resins [A] to [C]. During this process, other components excluding the curing agent [D] and curing accelerator (e.g. just the block copolymer [E]) may be added to the epoxy resins and kneaded with them. After this, the mixture is cooled down to a temperature of preferably 100° C. or less, more preferably 80° C. or less and most preferably 60° C. or less, while being stirred, followed by the addition of the curing agent [D] and curing accelerator and kneading to disperse those components. This method is preferably used as it provides an epoxy resin composition with excellent storage stability.

Next, fiber-reinforced composite materials are described. By curing an epoxy resin composition of the present invention after impregnating reinforcing fibers with it, a fiber-reinforced composite material that contains, as its matrix resin, the epoxy resin composition of the present invention in the form of a cured product may be obtained.

There are no specific limitations or restrictions on the type of reinforcing fiber used under the present invention, and a wide range of fibers, including glass fiber, carbon fiber, aramid fiber, boron fiber, alumina fiber and silicon carbide fiber, are used. Two or more of these reinforcing fibers may be mixed and put to use. However, it is preferable to use carbon fiber as it provides fiber-reinforced composite materials that are particularly lightweight and stiff. Of all carbon fibers, those with a tensile modulus of 230 to 800 GPa, more preferably 280 GPa, are preferably used. If a carbon fiber with a high modulus of 230 to 800 GPa is combined with an epoxy resin composition of the present invention, the Advantageous Effect of the Invention manifests all the more significantly, giving rise to a tendency for fiber-reinforced composite materials with good impact resistance to be more readily obtained.

There are no specific limitations or restrictions on the form of reinforcing fiber, and fibers with diverse forms may be used, including, for instance, long fibers (drawn in one direction), tow, fabrics, mats, knits, plaits, and short fibers (chopped into lengths of less than 10 mm). Here, long fibers mean single fibers or fiber bundles that are effectively continuous for at least 10 mm. Short fibers, on the other hand, are fiber bundles that have been chopped into lengths of less than 10 mm. Fiber configurations in which reinforcing fiber bundles have been aligned in the same direction are most suited for applications where a high specific strength and specific modulus are required.

Fiber-reinforced composite materials of the present invention may be manufactured using methods such as the prepreg lamination and molding method, resin transfer molding method, resin film infusion method, hand lay-up method, sheet molding compound method, filament winding method and pultrusion method, though no specific limitations or restrictions apply in this respect.

The resin transfer molding method is a method in which a reinforcing fiber base material is directly impregnated with a liquid thermosetting resin composition and cured. Since this method does not involve an intermediate product, such as a prepreg, it has great potential for molding cost reduction and is advantageously used for the manufacture of structural materials for spacecraft, aircraft, rail vehicles, automobiles, marine vessels and so on.

The prepreg lamination and molding method is a method in which a prepreg or prepregs, produced by impregnating a reinforcing fiber base material with a thermosetting resin composition, is/are formed and/or laminated, followed by the curing of the resin through the application of heat and pressure to the formed and/or laminated prepreg/prepregs to obtain a fiber-reinforced composite material.

The filament winding method is a method in which one to several tens of reinforcing fiber rovings are drawn together in one direction and impregnated with a thermosetting resin composition as they are wrapped around a rotating metal core (mandrel) under tension at a predetermined angle. After the wraps of rovings reach a predetermined thickness, it is cured and then the metal core is removed.

The pultrusion method is a method in which reinforcing fibers are continuously passed through an impregnating tank filled with a liquid thermosetting resin composition to impregnate them with the thermosetting resin composition, followed by a squeeze die and heating die for molding and curing, by continuously drawing them using a tensile machine. Since this method offers the advantage of continuously molding fiber-reinforced composite materials, it is used for the manufacture of fiber-reinforced plastics (FRPs) for fishing rods, rods, pipes, sheets, antennas, architectural structures, and so on.

Of these methods, the prepreg lamination and molding method is preferable as it gives excellent stiffness and strength to the fiber-reinforced composite materials obtained.

It is preferable that prepregs contain an epoxy resin composition of the present invention and reinforcing fibers. Such prepregs can be obtained by impregnating a reinforcing fiber base material with an epoxy resin composition of the present invention. Impregnation methods include the wet method and hot melt method (dry method).

The wet method is a method in which reinforcing fibers are first immersed in a solution of an epoxy resin composition, created by dissolving the epoxy resin composition in a solvent, such as methyl ethyl ketone or methanol, and retrieved, followed by the removal of the solvent through evaporation via an oven, etc. to impregnate reinforcing fibers with the epoxy resin composition. The hot-melt method may be implemented by impregnating reinforcing fibers directly with an epoxy resin composition, made fluid by heating in advance, or by first coating a piece or pieces of release paper or the like with an epoxy resin composition for use as resin film and then placing a film over one or either side of reinforcing fibers as configured into a flat shape, followed by the application of heat and pressure to impregnate the reinforcing fibers with the resin. The hot-melt method is preferable as the prepreg has virtually no residual solvent in it.

It is preferable that the reinforcing fiber cross-sectional density of a prepreg be 70 to 200 $g/m^2$. If the cross-sectional density falls below 70 $g/m^2$, there is a need to laminate a large number of prepregs to secure the predetermined thickness when molding a fiber-reinforced composite material, and this sometimes complicates lamination work. If, on the other hand, the cross-sectional density exceeds 200 $g/m^2$, the drapability of the prepreg tends to be poor. The reinforcing fiber mass fraction of a prepreg is preferably 60 to 90 mass %, more preferably 65 to 85 mass % and most preferably 70 to 80 mass %. If the reinforcing fiber mass fraction falls below 60 mass %, there is too much resin content, and this sometimes undermines the advantage of a fiber-reinforced composite material in terms of its excellent specific strength and specific modulus, as well as causing the fiber-reinforced composite material to generate too much heat during the curing time. If the reinforcing fiber mass fraction exceeds 90 mass %, impregnation with the resin tends to be unsatisfactory, giving rise to a risk of a large number of voids forming in the fiber-reinforced composite material.

To apply heat and pressure under the prepreg lamination and molding method, the press molding method, autoclave molding method, bagging molding method, wrapping tape method, internal pressure molding method, or the like may be used as appropriate.

The autoclave molding method is a method in which prepregs are laminated on a tool plate of a predetermined shape and then covered with bagging film, followed by curing, performed through the application of heat and pressure while air is sucked out of the laminate. It allows precision control of the fiber orientation, as well as providing high-quality molded materials with excellent mechanical characteristics, thanks to the generation of few voids. The pressure applied during the molding process is preferably 0.3 to 1.0 MPa, while the molding temperature is preferably in the 90 to 200° C. range.

The wrapping tape method is a method in which prepregs are wrapped around a mandrel or some other cored bar to form a tubular fiber-reinforced composite material. This method is advantageously used to produce golf shafts, fishing poles and other rod-shaped products. In more concrete terms, the method involves the wrapping of prepregs around a mandrel, wrapping of wrapping tape made of thermoplastic film over the prepregs under tension for the purpose of securing the prepregs and applying pressure to them. After curing of the resin through heating inside an oven, the cored bar is removed to obtain the tubular body. The tension used to wrap the wrapping tape is preferably 20 to 78 N. The molding temperature is preferably in the 80 to 200° C. range.

The internal pressure forming method is a method in which a preform obtained by wrapping prepregs around a thermoplastic resin tube or some other internal pressure applicator is set inside a metal mold, followed by the introduction of high pressure gas into the internal pressure applicator to apply pressure, accompanied by the simultaneous heating of the metal mold to mold the prepregs. This method is advantageously used when forming objects with complex shapes, such as golf shafts, bats, and tennis or badminton rackets. The pressure applied during the molding process is preferably 0.1 to 2.0 MPa. The molding temperature is preferably between room temperature and 200° C. and more preferably in the 80 to 180° C. range.

Fiber-reinforced composite materials that contain cured resins obtained from epoxy resin compositions of the present invention and reinforcing fibers are advantageously used in sports applications, general industrial applications, and aeronautic and space applications. Concrete sports applications in which these materials are advantageously used include golf shafts, fishing rods, tennis or badminton rackets, hockey sticks and ski poles. Concrete general industrial applications in which these materials are advantageously used include structural materials for vehicles, such as automobiles, bicycles, marine vessels and rail vehicles, drive shafts, leaf springs, windmill blades, pressure vessels, flywheels, papermaking rollers, roofing materials, cables, and repair/reinforcement materials.

Tubular fiber-reinforced composite materials produced by curing prepregs of the present invention into tubular shape are advantageously used for golf shafts, fishing rods, and the like.

EXAMPLES

The present invention is now described in more detail by way of examples. The measurement of various properties was carried out using the methods described below. Those properties were, unless otherwise noted, measured under environmental conditions comprising a temperature of 23° C. and a relative humidity of 50%.

(1) Preparation of Epoxy Resin Composition

Prescribed amounts of all the components other than the curing agent and curing accelerator were placed in a kneader, and the mixture was heated to 150° C. while being kneaded, followed by an hour of kneading at 150° C., which produced a transparent viscous liquid. After letting it cool down to 70° C. while kneading was provided, prescribed amounts of the curing agent and curing accelerator were added, followed by further kneading, and an epoxy resin composition was obtained. Component contents used in examples and comparative examples are as shown in Tables 2 to 5. The SP values, softening points and number average molecular weights of the epoxy resins used are shown in Table 1.

<Epoxy Resin ([A1] or [A2])>
Bisphenol A-type epoxy resin (jER (registered trademark) 1007, epoxy equivalent: 1925, manufactured by Mitsubishi Chemical Corporation)
Bisphenol F-type epoxy resin (jER (registered trademark) 4007P, epoxy equivalent: 2270, manufactured by Mitsubishi Chemical Corporation)
Bisphenol F-type epoxy resin (jER (registered trademark) 4010P, epoxy equivalent: 4400, manufactured by Mitsubishi Chemical Corporation)

<Epoxy Resin ([B1] or [B2])>
Tetraglycidyl diaminodiphenyl methane (Sumiepoxy (registered trademark) ELM434, epoxy equivalent: 125, manufactured by Sumitomo Chemical Co., Ltd.)
Triglycidyl-p-aminophenol (jER (registered trademark) jER630, epoxy equivalent: 98, manufactured by Mitsubishi Chemical Corporation)
Triglycidyl-p-aminophenol (Araldite (registered trademark) MY0500, epoxy equivalent: 110, manufactured by Huntsman Advanced Materials Gmbh)
3,3'-Tetraglycidyl diaminodiphenyl ether (TG3DDE, epoxy equivalent: 122, manufactured by Toray Fine Chemicals Co., Ltd.)

<Epoxy Resin ([B1])>
3,3'-Tetraglycidyl diaminodiphenyl sulfone (TG3DAS, epoxy equivalent: 136, manufactured by Konishi Chemical Ind. Co., Ltd.)

<Epoxy Resin ([C1] or [C2])>
Bisphenol F-type epoxy resin (Epicron (registered trademark) 830, epoxy equivalent: 170, manufactured by DIC)

<Epoxy Resin ([C1])>
Phenol novolac resin jER (registered trademark) 152, manufactured by Mitsubishi Chemical Corporation)

<Curing Agent ([D])>
Dicyandiamide (curing agent, DICY7, manufactured by Mitsubishi Chemical Corporation).

<Block Copolymer [E]>
S-B-M copolymer (Nanostrength (registered trademark) E40: wherein S is polystyrene (Tg: about 90° C.), B is poly1,4-butadiene (Tg: about −90° C.) and M is polymethyl methacrylate (Tg: about 130° C.), manufactured by Arkema K.K.)
M-B-M copolymer (Nanostrength (registered trademark) M22N: wherein B is polybutyl acrylate (Tg: about −50° C.) and M is a block copolymer based on methyl methacrylate and a monomer containing a polar functional group whose SP value is higher than that of methyl methacrylate (Tg: about 130° C.), manufactured by Arkema K.K.).

<Other Components>
Polyfunctional epoxy resin (jER (registered trademark) 1031S, epoxy equivalent: 200, manufactured by Mitsubishi Chemical Corporation)
Bisphenol A-type epoxy resin (jER (registered trademark) 1001, epoxy equivalent: 470, manufactured by Mitsubishi Chemical Corporation)
Bisphenol F-type epoxy resin (jER (registered trademark) 4004P, epoxy equivalent: 880, manufactured by Mitsubishi Chemical Corporation)
Glycidylphthalimide (Denacol (registered trademark) EX731, epoxy equivalent: 216, manufactured by Nagase ChemteX Corporation)

Polyethylene glycol-type epoxy resin (Denacol (registered trademark) EX821, epoxy equivalent: 185, manufactured by Nagase ChemteX Corporation)

N,N'-diglycidyl aniline (GAN, epoxy equivalent: 125, manufactured by Nippon Kayaku Co., Ltd.)

Vinylec (registered trademark) PVF-K (polyvinyl formal), manufactured by JNC)

DCMU99 (3-(3,4-dichlorophenyl)-1,1-dimethylurea, curing accelerator, manufactured by Hodogaya Chemical Co., Ltd. industry).

(2) Measurement of Number Average Molecular Weight

Measurements were carried out using HLC (registered trademark) 8220GPC (manufactured by Tosoh Corporation) as a measurement system, UV-8000 (254 nm) as a detector, and TSK-G4000H (manufactured by Tosoh Corporation) as a column. The epoxy resin to be measured was dissolved in THF to a concentration of 0.1 mg/ml, and this was subjected to measurement at a flow rate 1.0 ml/min and a temperature of 40° C. The number average molecular weight was obtained by converting the retention time of the specimen to molecular weight using the retention time of a polystyrene calibration sample.

(3) Modulus of Cured Resin

After defoaming under vacuum, the epoxy resin composition was injected into a mold set for a thickness of 2 mm using a 2 mm-thick Teflon (registered trademark) spacer and then cured, unless noted otherwise, for 90 minutes at a temperature of 130° C. to obtain a 2 mm-thick plate-shaped cured resin. A specimen measuring 10 mm wide and 60 mm long was then cut from the obtained cured resin and subjected to a three-point bend test at a span of 32 mm and a crosshead speed of 100 mm/min using an Instron universal testing machine (manufactured by Instron Corporation), with the modulus measured in accordance with ES K7171 (1994). There were five specimens, and the average measurement (n=5) was adopted as the value of the modulus.

(4) Measurement of Resin Toughness of Cured Resin

After defoaming under vacuum, the epoxy resin composition was cured, unless otherwise noted, at 130° C. for 90 minutes inside a mold set for a thickness of 6 mm using a 6 mm-thick Teflon (registered trademark) spacer to obtain a 6 mm-thick plate-shaped cured resin. A specimen measuring 12.7 mm×150 mm was cut from the obtained cured resin. Next, the specimen was processed and tested using an Instron universal testing machine (made by Instron) in accordance with ASTM D5045 (1999). The introduction of an initial crack into the specimen was performed by placing a razor blade, cooled down to liquid nitrogen temperature, against the specimen and striking the back of the blade with a hammer to apply an impact force. Here, resin toughness refers to critical stress in deformation mode I (open mode). There were five specimens, and the average measurement (n=5) was adopted as the resin toughness value.

(5) Measurement of Structural Period

After staining, the cured resin obtained in (4) above was cut into thin slices, and transmission electron images were taken of them using a transmission electron microscope (TEM) under the conditions specified below. As staining agents, OsO4 and RuO4 were alternately used according to resin constitution to ensure that the morphology was well-contrasted.

Equipment: H-7100 Transmission electron microscope (manufactured by Hitachi, Ltd.)
Accelerating voltage: 100 kV
Magnification: ×10,000.

From transmission electron images, the structural period for the [A1] or [A2]-rich phase, [B1] or [B2]-rich phase and [E]-rich phase were observed. The phase separation structure of a cured resin varies between the phase continuous structure and the sea-island structure according to the types of components and their content, and measurements were made on a case by case basis as described below:

When the phase separation structure was a phase continuous structure, three straight lines of a predetermined length were randomly drawn on a microscopic photograph, and intersections between these straight lines and phase interfaces were located. Distances between adjacent intersections were then measured, with their number average defined as the phase separation structural period. On the basis of a microscopic photograph, such a predetermined length was set as follows: When the structural period was expected to be in the order of 0.01 μm (0.01 μm or more and less than 0.1 μm), the predetermined length was the length of a 20 mm-long straight line drawn on a photograph taken at a magnification of ×20,000 (1 μm on the specimen). Similarly, when the structural period was expected to be in the order of 0.1 μ(0.1 μm or more and less than 1 μm), the predetermined length was the length of a 20 mm-long straight line drawn on a photograph taken at a magnification of ×2000 (10 μm on the specimen), while, when the structural period was expected to be in the order of 1 μ(1 μm or more and less than 10 μm), the predetermined length was the length of a 20 mm-long straight line drawn on a photograph taken at a magnification of ×200 (100 μm on the specimen). When the measured phase separation structural period fell outside the expected range, a repeat measurement was made at a magnification that corresponded to the actual structural period.

When the phase separation structure was a sea-island structure, three regions of a predetermined size were randomly selected on a microscopic photograph, and the sizes of island phase areas present in those regions were measured, with their number average defined as the phase separation structural period. The size of an island phase area is defined as the length of the shortest straight line drawn from a point on one side of the phase interface to another point on the other side of the phase interface through the island. This applies regardless of whether the island phase is an ellipse, random shape or two or more nested circles or ellipses. The predetermined size of a randomly selected region was set as follows: When the structural period was expected to be in the order of 0.01 μm (0.01 μm or more and less than 0.1 μm), the predetermined size was the size of a 4 mm-square region drawn on a photograph taken at a magnification of ×20,000 (0.2 μm on the specimen). Similarly, when the structural period was expected to be in the order of 0.1 μm (0.1 μm or more and less than 1 μm), the predetermined size was the size of a 4 mm-square region drawn on a photograph taken at a magnification of ×2000 (2 μm on the specimen), while, when the structural period was expected to be in the order of 1 μm (1 μm or more and less than 10 μm), the predetermined size was the size of a 4 mm-square region drawn on a photograph taken at a magnification of ×200 (20 μm on the specimen). When the measured phase separation structural period fell outside the expected range, a repeat measurement was made at a magnification that corresponded to the actual structural period.

(6) Preparation of Prepreg

Sheets of resin film were prepared by coating pieces of release paper with the epoxy resin composition using a reverse roll coater. Next, pieces of the carbon fiber Torayca (registered trademark) T800SC-24K (manufactured by Toray Industries, Inc, tensile modulus: 294 GPa, tensile strength: 5880 MPa) were laid side by side in the same orientation to form a sheet shape, and a sheet of resin film was placed over either side of this fiber sheet. The carbon fiber was then impregnated with the epoxy resin composition through the application of heat and pressure, and a T800SC-based unidirectional prepreg with a cross-sectional carbon fiber density of 125 g/m$^2$ and a fiber mass fraction of 75 mass % was obtained. Another unidirectional prepreg—a T700SC-based one with a cross-sectional carbon fiber density of 125 g/m$^2$ and a fiber mass fraction of 75 mass %, i.e. identical with the above prepreg except that it used T700SC-24K (manufactured by Toray Industries, Inc., tensile modulus: 230 GPa, tensile strength: 4900 MPa)—was also prepared.

(7) Preparation of Unidirectional Laminate

Twenty plies of the unidirectional prepreg prepared in (6) above were laminated in a uniform fiber orientation. The laminated prepregs were then covered with nylon film without any gaps and cured by heating under pressure inside an autoclave over 2 hours at a temperature of 135° C. and an internal pressure of 588 kPa to mold a unidirectional laminate.

(8) Preparation of Tubular Fiber-Reinforced Composite Material for Charpy Impact Test By following the steps (a) to (e) below, a tubular body with an internal diameter of 6.3 mm made of a fiber-reinforced composite material was prepared by first laminating three plies of the T800SC-based unidirectional prepreg by alternately changing the direction of their fibers between 45° and −45° with respect to the direction of the tubular body and then laminating another three plies of the T800SC-based unidirectional prepreg by aligning the direction of their fibers with the tubular body. As a mandrel, a stainless steel rod with a diameter of 6.3 mm and a length of 1000 mm was used.

(a) From a T800SC-based unidirectional prepreg produced in accordance with the procedure described in (6) above, two rectangular sheets, each measuring 104 mm long×800 mm wide, were cut (with their fibers oriented at 45 degrees to the longer side of the rectangle). The two prepregs were then bonded together in a manner to let the two sets of fibers cross each other, while a 10 mm offset in the direction of the shorter side (equivalent to half a circumference of the mandrel) was also introduced.

(b) The two prepregs, bonded together as described above, were wrapped around a mandrel, which had been treated for easy release in advance, in a manner to align the longer sides of the rectangular prepregs and the axis of the mandrel.

(c) Next, from a T800SC-based unidirectional prepreg produced in accordance with the procedure described in (6) above, a rectangular piece measuring 114 mm long×800 mm wide (with its fibers aligned with the longer side of the rectangle) was cut and then wrapped around the mandrel in a manner to align its fibers with the axis of the mandrel.

(d) Finally, wrapping tape (heat-resistant film tape) was wrapped over the whole thing, which was then placed in a curing furnace to cure the prepregs by, unless otherwise noted, heating at 130° C. for 90 minutes. The wrapping tape was 15 mm wide, wrapped in two layers at a tension of 34 N and with a wrapping pitch (an offset between layers of tape introduced during wrapping) of 2.0 mm.

(e) After this, the mandrel and wrapping tape were removed to obtain a tubular fiber-reinforced composite material.

By following steps (a) to (e) above except for the use of T700SC-based prepregs prepared in (6) above, a T700SC-based tubular fiber-reinforced composite material was also prepared.

(9) Charpy impact test of tubular fiber-reinforced composite material

The tubular fiber-reinforced composite material obtained in (8) above was cut to a length of 60 mm to obtain a specimen measuring 6.3 mm in inside diameter and 60 mm in length. The specimen was then subjected to a Charpy impact test by applying an impact force to the side face of the tubular specimen using a 300 kg·cm hammer, with the amount of impact energy absorbed calculated from the swing-up angle using the following formula:

$$E = WR[(\cos\beta - \cos\alpha) - (\cos\alpha' - \cos\alpha)(\alpha+\beta)/(\alpha+\alpha')]$$

E: Absorbed energy (J)
WR: Moment about hammer rotation axis (N·m)
α: Hammer lifting angle (°)
α': Hammer swing-up angle (°) after idle swing-down from lifting angle α
β: Hammer swinging-up angle (°) after rupture of specimen Prior to the test, no notch (V-shaped indentation) was introduced to the specimen. There were five specimens, and the average measurement (n=5) was adopted as the Charpy impact value.

(10) Measurement Method for 0° Flexural Strength of Unidirectional Laminate

As an indicator of the flexural strength of a fiber-reinforced composite material, the 0° flexural strength of unidirectional laminates was measured. A specimen measuring 2 mm in thickness, 15 mm in width and 100 mm in length was cut from a unidirectional laminate. The specimen was then subjected to a measurement at a crosshead speed of 5.0 mm/min, a span of 80 mm, an indenter diameter of 10 mm and a fulcrum diameter of 4 mm using an Instron universal testing machine, with its flexural strength calculated from the result. The flexural strength obtained was also converted to Vf 60% after obtaining actual Vf on the basis of the fiber cross-sectional density of the prepreg prepared.

(11) Measurement of Softening Point (Ring-and-Ball Method Method)

Measurement was carried out using the ring-and-ball method from JIS-K7234 (2008).

(12) Measurement of Glass Transition Temperature of Epoxy Component in Cured Resin A specimen measuring 13 mm in width and 35 mm in length was cut from a cured resin prepared in accordance with the same procedure as the one described in (3) above. The specimen was then subjected to the measurement of a glass transition temperature in 1.0 Hz bending mode using a dynamic viscoelasticity measuring device (DMAQ800, manufactured by TA Instruments) by heating it to temperatures of 40° C. to 250° C. at a rate of 5° C./min. The glass transition temperature was defined as the storage elastic modulus onset temperature. Tables 2 to 5 show measurement results. Cured resins with a phase separation structure sometimes exhibit two glass transition temperatures, and Tables 2 to 5 include the lower temperature.

Example 1

An epoxy resin composition was prepared by blending 40 parts of jER1007 as the epoxy resin [A1] or [A2], 20 parts of jER630 as the epoxy resin [B1] or [B2], 40 parts of Epicron 830 as the epoxy resin [C1] or [C2], an amount of DICY7 containing active hydrogen groups quantified at 0.9 equivalent of the epoxy groups contained in all epoxy resin components as the curing agent [D], and two parts of DCMU99 as the curing accelerator. The viscosity at 80° C.

of the epoxy resin composition obtained was good. The epoxy resin composition was heated at a rate of 2.5° C./min and cured at 130° C. over 90 minutes. The cured resin obtained formed a fine phase separation structure and had good mechanical characteristics. Using the epoxy resin composition obtained and T800SC-24K carbon fibers, prepregs were prepared in a manner described earlier. The tubular fiber-reinforced composite material and unidirectional laminate produced from the prepregs obtained in a manner described earlier had good impact resistance characteristics and good 0° flexural strength, respectively. Measurement results are shown in Table 2.

Examples 2 to 26 and Comparative Example 1 to 11

Epoxy resin compositions were prepared in the same manner as example 1 except that they had different constitutions as shown in Tables 2 to 5. Evaluation results are shown in Tables 2 to 5. All cured resins obtained from epoxy resin compositions produced under various examples had a fine phase separation structure and had good mechanical characteristics. All tubular fiber-reinforced composite materials and unidirectional laminates produced from prepregs comprising the epoxy resin compositions obtained and carbon fibers had good impact resistance characteristics and 0° flexural strength, respectively.

As the epoxy resin composition of comparative example 1 did not use an epoxy resin [A1] or [A2], the cured resin obtained had an inadequate resin toughness value due to the formation of a uniform structure lacking in phase separation. As a result, the tubular fiber-reinforced composite material produced from the epoxy resin composition obtained and carbon fibers had inadequate impact resistance characteristics.

As the epoxy resin composition of comparative example 2 did not use an epoxy resin [B1] or [B2], the cured resin obtained had an inadequate resin toughness value due to the formation of a uniform structure lacking in phase separation. As a result, the tubular fiber-reinforced composite material had inadequate impact resistance characteristics.

As the epoxy resin composition of comparative example 3 did not use an epoxy resin [B1] or [B2], the cured resin obtained had an inadequate modulus due to the formation of a uniform structure lacking in phase separation. As a result, the unidirectional prepreg laminate produced from the epoxy resin composition obtained and carbon fibers had inadequate 0° flexural strength.

As the epoxy resin composition of comparative example 4 did not use the epoxy resin [A1] or [A2], the cured resin obtained had an inadequate resin toughness value due to the formation of a uniform structure lacking in phase separation. As a result, the tubular fiber-reinforced composite material produced from the epoxy resin composition obtained and carbon fibers had inadequate impact resistance characteristics.

As the epoxy resin composition of comparative example 5 did not use the epoxy resin [C1] or [C2], the cured resin obtained had an inadequate modulus due to the formation of a coarse phase separation structure. The epoxy resin composition also had a viscosity at 80° C. of more than 200 Pa·s, leading to the formation of voids in the fiber-reinforced composite material produced from the epoxy resin composition obtained and carbon fibers. All in all, the unidirectional prepreg laminate had inadequate mechanical characteristics.

Although the epoxy resin composition of comparative example 6 gave rise to a cured resin with a fine phase separation structure, it had an inadequate modulus compared to example 10 due to the absence of an epoxy resin [C1] or [C2]. As a result, the unidirectional prepreg laminate produced from the epoxy resin composition obtained and carbon fibers had inadequate 0° flexural strength.

As the epoxy resin composition of comparative example 7 did not use the epoxy resin [B1] or [B2], the cured resin obtained had an inadequate modulus due to the formation of a uniform phase structure. The epoxy resin composition also had a viscosity at 80° C. of more than 200 Pa·s, leading to the formation of voids in the fiber-reinforced composite material. Moreover, the unidirectional prepreg laminate produced from the epoxy resin composition obtained and carbon fibers had inadequate 0° flexural strength.

As the epoxy resin composition of comparative example 8 did not use the epoxy resin [A1] or [A2], the cured resin obtained had a severely inadequate resin toughness value due to the formation of a uniform phase structure. As a result, the tubular fiber-reinforced composite material produced from the epoxy resin composition obtained and carbon fibers had inadequate impact resistance characteristics.

As the epoxy resin composition of comparative example 9 did not use the epoxy resin [C1] or [C2], the cured resin obtained had a severely inadequate resin toughness value due to the formation of a coarse phase separation structure. As a result, the tubular fiber-reinforced composite material produced from the epoxy resin composition obtained and carbon fibers had inadequate impact resistance characteristics.

As the epoxy resin composition of comparative example 10 did not use the epoxy resin [A1] or [A2], the cured resin obtained had a severely inadequate resin toughness value due to the formation of a uniform phase structure. As a result, the tubular fiber-reinforced composite material produced from the epoxy resin composition obtained and carbon fibers had inadequate impact resistance characteristics.

As the epoxy resin composition of comparative example 11 did not use the epoxy resin [A1] or [A2], the cured resin obtained had an inadequate modulus and resin toughness value due to the formation of a uniform structure. As a result, the unidirectional laminate and tubular fiber-reinforced composite material produced from the epoxy resin composition obtained and carbon fibers had inadequate 0° flexural strength and impact resistance characteristics, respectively.

TABLE 1

| | | SP value [(cal/cm$^3$)$^{1/2}$] | Softening point [° C.] | elastic modulus [GPa] | Number average molecular weight |
|---|---|---|---|---|---|
| [A1] or [A2] | jER 1007 | 12.2 | 128 | | 3950 |
| | jER 4007P | 12.9 | 108 | | 4540 |
| | jER 4010P | 12.9 | 135 | | 8800 |

TABLE 1-continued

|  |  | SP value [(cal/cm³)^(1/2)] | Softening point [° C.] | elastic modulus [GPa] | Number average molecular weight |
|---|---|---|---|---|---|
| [B1] or [B2] | ELM 434 | 14.4 | 50° C. or less |  | 480 |
|  | 3,3'-TGDDE | 14.7 |  |  | 482 |
|  | jER630 | 14.8 |  |  | 294 |
|  | MY0500 | 14.8 |  |  | 330 |
| [B1] | TG3DAS | 13.9 |  |  | 544 |
| [C1] or [C2] | Epicron 830 | 13.1 |  | 3.7 | 340 |
| [C2] | jER152 | 13.0 |  | 3.6 | 370 |
| Other epoxy resins | jER 4004P | 13.0 | 85 |  | 1760 |
|  | jER1031S | 14.1 | 92 |  | 784 |
|  | GAN | 13.7 | 10° C. or less |  | 500 |
|  | jER 1001 | 12.0 | 64 |  | 900 |
|  | EX731 | 14.2 | 94 |  | 216 |
|  | EX821 | 12.3 | 50° C. or less | 1.0 | 370 |

TABLE 2

|  |  | unit | Example 1 | Example 2 | Example 3 | Example 4 | Example 5 | Example 6 | Example 7 | Example 8 | Example 9 | Example 10 |
|---|---|---|---|---|---|---|---|---|---|---|---|---|
| [A1] or [A2] | jER 1007 | parts by mass | 40 | 20 |  |  |  |  | 30 |  |  |  |
|  | jER 4007P |  |  |  |  | 20 | 35 | 35 |  | 30 | 40 | 40 |
|  | jER 4010P |  |  |  | 10 |  |  |  |  |  |  |  |
| [B1] or [B2] | ELM 434 |  |  |  | 60 | 50 |  | 20 | 20 |  | 40 |  |
|  | jER630 |  |  | 20 |  |  |  |  |  |  |  |  |
|  | MY0500 |  |  |  |  |  | 30 |  |  | 40 | 40 | 40 |
|  | 3,3'-TGDDE |  |  |  |  |  |  |  |  |  |  |  |
| [B1] | TG3DAS |  |  |  |  |  |  |  |  |  |  |  |
| [C1] or [C2] | Epicron 830 |  | 40 | 20 | 40 | 50 | 45 | 45 | 30 | 30 | 20 | 20 |
| [C2] | jERI52 |  |  |  |  |  |  |  |  |  |  |  |
| [D] | DICY7 | equivalent parts by mass | 0.9 | 0.9 | 0.9 | 0.9 | 0.9 | 0.9 | 0.9 | 0.9 | 0.9 | 0.9 |
| [E] | S-B-M |  |  |  |  |  |  |  |  |  |  |  |
|  | M-B-M |  |  |  |  |  |  |  |  |  |  |  |
| Others | jER1031S |  |  |  |  |  |  |  |  |  |  |  |
|  | PVF-K |  |  |  |  |  | 5 | 5 |  |  |  |  |
| Curing accelerator | DCMU99 |  | 2 | 2 | 2 | 2 | 2 | 3 | 2 | 2 | 2 | 2 |
| Existence of phase separation in cured resin *1 | [A] and [B] epoxy resin and [E] |  | A — | A — | A — | A — | A — | A — | A — | A — | A — | A — |
| Toughness of cured resin |  | MPa·m^(1/2) | 1.4 | 0.9 | 0.9 | 0.9 | 1.2 | 1.2 | 1.4 | 1.4 | 1.4 | 1.5 |
| Modulus of cured resin |  | GPa | 3.7 | 3.9 | 3.9 | 3.8 | 3.9 | 3.9 | 4.0 | 4.2 | 4.0 | 4.2 |
| Viscosity at 80° C. |  | Pa·s | 25 | 10 | 6 | 15 | 111 | 122 | 47 | 11 | 41 | 27 |
| Glass transition temperature of cured resin |  | ° C. | 112 | 95 | 97 | 91 | 95 | 93 | 110 | 92 | 93 | 90 |
| Charpy impact of tube of fiber-reinforced composite material | T800Suse T700Suse | J | 11.3 — | 8.7 — | 8.5 — | 8.8 — | 10.8 — | 11.1 — | 11.5 — | 11.7 — | 11.6 — | 12.0 — |
| 0° flexural strength of unidirectional laminate | T800Suse T700Suse | GPa | 1381 — | 1498 — | 1509 — | 1416 — | 1482 — | 1467 — | 1527 — | 1581 — | 1565 — | 1603 — |

*1 A: phase separation size 1 nm or more and less than 1 μm, B: phase separation size 1 μm or more and less than 5 μm, C: uniform structure, D: phase separation structure of 5 μm or more

TABLE 3

|  |  | unit | Example 11 | Example 12 | Example 13 | Example 14 | Example 15 | Example 16 | Example 17 | Example 18 | Example 19 | Example 20 |
|---|---|---|---|---|---|---|---|---|---|---|---|---|
| [A1] or [A2] | jER 1007 | parts by mass |  |  |  |  |  |  |  |  |  |  |
|  | jER 4007P |  | 40 | 40 |  | 45 | 45 | 30 | 50 | 20 | 20 | 20 |
|  | jER 4010P |  |  |  | 40 |  |  |  |  |  |  |  |
| [B1] or [B2] | ELM 434 |  |  |  |  |  |  |  |  |  |  |  |
|  | jER630 |  |  | 40 |  |  |  |  |  | 40 | 40 | 40 |
|  | MY0500 |  |  |  | 40 | 45 | 45 | 50 | 30 |  |  |  |
|  | 3,3'-TGDDE |  |  |  |  |  |  |  |  |  |  |  |
| [B1] | TG3DAS |  |  |  |  |  |  |  |  |  |  |  |
| [C1] or [C2] | Epicron 830 |  | 20 | 20 | 20 | 10 | 10 | 20 | 20 | 40 | 20 | 40 |
| [C2] | jERI52 |  |  |  |  |  |  |  |  |  |  |  |
| [D] | DICY7 | equivalent | 0.9 | 0.9 | 0.9 | 0.9 | 0.9 | 0.9 | 0.9 | 0.9 | 0.9 | 0.9 |

TABLE 3-continued

|  | | unit | Example 11 | Example 12 | Example 13 | Example 14 | Example 15 | Example 16 | Example 17 | Example 18 | Example 19 | Example 20 |
|---|---|---|---|---|---|---|---|---|---|---|---|---|
| [E] | S-B-M | | | | | | | | | | | |
|  | M-B-M | | | | | | | | | | | |
| Other | jER1031S | parts by | | | | | | | | | 20 | |
|  | PVF-K | mass | | | | | | | | | | 10 |
| Curing accelerator | DCMU99 | | 2 | 2 | 2 | 2 | 2 | 2 | 2 | 2 | 2 | 2 |
| Existence of phase separation in cured resin *1 | [A] and [B] | | A | A | A | A | A | A | A | A | A | A |
|  | epoxy resin and [E] | | — | — | — | — | — | — | — | — | — | — |
| Toughness of cured resin | | MPa·m$^{1/2}$ | 1.6 | 1.6 | 2 | 1.6 | 1.6 | 1.4 | 1.6 | 1.3 | 1.3 | 1.3 |
| Modulus of cured resin | | GPa | 4.4 | 4.4 | 4.2 | 4.3 | 4.3 | 4.5 | 3.9 | 4.3 | 4.1 | 4.3 |
| Viscosity at 80° C. | | Pa·s | 20 | 32 | 50 | 48 | 48 | 20 | 34 | 2 | 16 | 31 |
| Glass transition temperature of cured resin | | °C. | 91 | 95 | 92 | 90 | 90 | 93 | 89 | 90 | 97 | 90 |
| Charpy impact of tube of fiber-reinforced composite material | T800Suse | J | 12.6 | 12.7 | 15.5 | — | 13.4 | 11.7 | 14.2 | 9.8 | 11.3 | 10.8 |
|  | T700Suse | | — | — | — | 11.8 | — | — | — | — | — | — |
| 0° flexural strength of unidirectional laminate | T800Suse | GPa | 1731 | 1739 | 1632 | — | 1713 | 1765 | 1502 | 1594 | 1611 | 1719 |
|  | T700Suse | | — | — | — | 1543 | — | — | — | — | — | — |

*1 A: phase separation size 1 nm or more and less than 1 μm, B: phase separation size 1 μm or more and less than 5 μm, C: uniform structure, D: phase separation structure of 5 μm or more

TABLE 4

|  | | unit | Example 21 | Example 22 | Example 23 | Example 24 | Example 25 | Example 26 |
|---|---|---|---|---|---|---|---|---|
| [A1] or [A2] | jER 1007 | parts by mass | 30 | | | | | |
|  | jER 4007P | | | 20 | 20 | 20 | 40 | 40 |
|  | jER 4010P | | | | | | | |
| [B1] or [B2] | ELM 434 | | 40 | | | | 40 | |
|  | jER630 | | | 40 | 40 | 40 | | |
|  | MY0500 | | | | | | | |
|  | 3,3'-TGDDE | | | | | | | |
| [B1] | TG3DAS | | | | | | | 30 |
| [C1] or [C2] | Epicron 830 | | 30 | 40 | 40 | 40 | | 30 |
| [C2] | jERI52 | | | | | | 20 | |
| [D] | DICY7 | equivalent | 0.9 | 0.9 | 0.9 | 0.9 | 0.9 | 0.9 |
| [E] | S-B-M | | | 3 | | | | |
|  | M-B-M | | | | 3 | 10 | | |
| other | jER1031S | parts by mass | | | | | | |
|  | PVF-K | | | | | | | |
| curing accelerator | DCMU99 | | 2 | 2 | 2 | 2 | 2 | 2 |
| Existence of phase separation in cured resin *1 | [A] and [B] | | A | A | A | A | A | B |
|  | epoxy resin and [E] | | — | A | A | A | — | — |
| Toughness of cured resin | | MPa·m$^{1/2}$ | 1.3 | 1.5 | 1.6 | 2.5 | 1.4 | 1.3 |
| Modulus of cured resin | | GPa | 3.8 | 4.2 | 4.1 | 3.8 | 3.8 | 4.4 |
| Viscosity at 80° C. | | Pa·s | 30 | 35 | 31 | 188 | 76 | 127 |
| Glass transition temperature of cured resin | | °C. | 87 | 87 | 89 | 86 | 95 | 87 |
| Charpy impact of tube of fiber-reinforced composite material | T800Suse | J | 10.7 | 12.8 | 13.6 | 18.1 | 11.4 | 10.1 |
|  | T700Suse | | — | — | — | — | — | — |
| 0° flexural strength of unidirectional laminate | T800Suse | GPa | 1491 | 1628 | 1602 | 1502 | 1453 | 1726 |
|  | T700Suse | | — | — | — | — | — | — |

*1 A: phase separation size 1 nm or more and less than 1 μm, B: phase separation size 1 μm or more and less than 5 μm, C: uniform structure, D: phase separation structure of 5 μm or more

TABLE 5

|  | unit | Comp. ex. 1 | Comp. ex. 2 | Comp. ex. 3 | Comp. ex. 4 | Comp. ex. 5 | Comp. ex. 6 | Comp. ex. 7 | Comp. ex. 8 | Comp. ex. 9 | Comp. ex. 10 | Comp. ex. 11 |
|---|---|---|---|---|---|---|---|---|---|---|---|---|
| [A1] or [A2] jER 1007 | parts by mass |  |  | 40 |  | 50 |  |  |  | 40 |  |  |
| jER 4007P |  |  | 30 |  |  |  | 40 | 50 |  |  |  |  |
| jER 4010P |  |  |  |  |  |  |  |  |  |  |  |  |
| [B1] or [B2] ELM 434 |  | 40 |  |  |  | 50 |  |  | 50 | 40 | 40 | 20 |
| jER630 |  |  |  |  |  |  |  |  |  |  |  |  |
| MY0500 |  |  |  |  | 40 |  | 40 |  |  |  |  |  |
| [C1] or [C2] Epicron 830 |  | 20 | 30 | 30 | 20 |  |  | 50 | 50 |  | 20 | 45 |
| [D] DICY7 | equivalent | 0.9 | 0.9 | 0.9 | 0.9 | 0.9 | 0.9 | 0.9 | 0.9 | 0.9 | 0.9 | 0.9 |
| Others jER828 | parts by mass |  |  |  |  |  |  |  |  |  |  |  |
| jER 1001 |  | 40 |  |  |  |  |  |  |  | 40 |  |  |
| jER 4004P |  |  |  |  |  |  |  |  |  |  |  | 35 |
| EX731 |  |  | 40 |  | 40 |  |  |  |  |  |  |  |
| EX821 |  |  |  | 30 |  |  | 20 |  |  |  |  |  |
| GAN |  |  |  |  |  |  |  |  |  | 20 |  |  |
| PVF-K |  |  |  |  |  |  |  |  |  |  |  | 5 |
| Curing accelerator DCMU99 |  | 2 | 2 | 2 | 2 | 2 | 2 | 2 | 2 | 2 | 3 | 3 |
| Existence of phase separation in cured resin *1 | [A] and [B] | C | C | C | C | D | B | C | C | D | C | C |
| Toughness of cured resin | MPa·m$^{1/2}$ | 0.5 | 0.6 | 1.0 | 0.6 | 1.2 | 1.1 | 1.5 | 0.8 | 0.8 | 0.8 | 0.8 |
| Modulus of cured resin | GPa | 3.7 | 4.2 | 2.0 | 4.6 | 3.5 | 2.8 | 3.6 | 4.0 | 4.0 | 3.7 | 3.7 |
| Viscosity at 80° C. | Pa·s | 15 | 36 | 12 | 38 | 681 | 27 | 41 | 0.4 | 178 | 13 | 47 |
| Glass transition temperature of cured resin | ° C. | 117 | 90 | 77 | 136 | 90 | 71 | 90 | 136 | 110 | 110 | 113 |
| Charpy impact of tube of fiber-reinforced composite material | T800Suse J | 6.5 | 7.3 | 10.1 | 7.4 | 9.2 | 10.4 | 11.6 | 8.0 | 8.1 | 7.9 | 7.8 |
| 0° flexural strength of unidirectional laminate | T800Suse GPa | 1416 | 1568 | 653 | 1725 | 1203 | 711 | 1314 | 1515 | 1527 | 1321 | 1330 |

*1 A: phase separation size 1 nm or more and less than 1 μm, B: phase separation size 1 μm or more and less than 5 μm, C: uniform structure, D: phase separation structure of 5 μm or more

INDUSTRIAL APPLICABILITY

Epoxy resin compositions of the present invention have high modulus and toughness. And they are low in viscosity, so they make the molding of prepregs with high fiber content possible. For this reason, combining those epoxy resin compositions with reinforcing fibers makes it possible to obtain fiber-reinforced composite materials with both excellent impact resistance and strength. Such fiber-reinforced composite materials are advantageously used in sports and general industrial, as well as aeronautical, applications.

The invention claimed is:

1. An epoxy resin composition containing an epoxy resin [A1], epoxy resin [B1], epoxy resin [C1] and curing agent [D],
   wherein [A1] is a bisphenol F-type epoxy resin with a softening point of 108° C. to 135° C., [B1] is a tri- or higher functional amine-type epoxy resin, [C1] is a bisphenol F-type epoxy resin with a number average molecular weight of 450 or less,
   wherein the epoxy resins [A1] to [C1] satisfy the following contents per 100 parts by mass of total epoxy resin content: [A1] 30 to 50 parts by mass, [B1] 30 to 50 parts by mass and [C1] 10 to 40 parts by mass, and
   wherein a cured resin obtained by curing the epoxy resin composition has a phase separation structure involving an [A1]-rich phase and a [B1]-rich phase with a phase separation structural period of 1 nm to 5 μm.

2. An epoxy resin composition containing an epoxy resin [A2], epoxy resin [B2], epoxy resin [C2] and curing agent [D];
   wherein [A2] is a bisphenol F-type epoxy resin with a softening point of 108° C. to 135° C.,
   [B2] is a tri- or higher functional amine-type epoxy resin,
   [C2] is a bisphenol F-type epoxy resin with a number average molecular weight of 450 or less, and
   the epoxy resins [A2] to [C2] satisfy the following contents per 100 parts by mass of total epoxy resin content: [A2] 30 to 50 parts by mass, [B2] 30 to 50 parts by mass and [C2] 10 to 40 parts by mass,
   and satisfies the conditions (1) to (4) below:
   (1) The SP value of the cured resin [B2'], obtained by having the epoxy resin [B2] react with the curing agent [D] and curing it, is larger than the SP value of each of the cured resin [A2'] and [C2'], obtained, respectively, by having the epoxy resin [A2] and [C2] react with the curing agent [D] and curing it, by at least 1.2;
   (2) The softening point of the epoxy resin [A2] is 90° C. or more and the softening points of the epoxy resin [B2] and [C2] are both 50° C. or less;
   (3) The modulus of the cured resin obtained by having an epoxy resin composition containing the epoxy resin [C2], dicyandiamide containing active hydrogen groups quantified at 0.9 equivalent relative to the epoxy groups contained in the epoxy resin [C2], and 2 parts by mass of 3-(3,4-dichlorophenyl)-1,1-dimethylurea per 100 parts by mass of the epoxy resin [C2] undergo a reaction at 130° C. for 90 minutes after raising its temperature from room temperature to 130° C. at a rate of 2.5° C./min is 3.5 GPa or more;
   (4) The cured resin obtained by curing the epoxy resin composition has a phase separation structure involving an [A2]-rich phase and a [B2]-rich phase with a phase separation structural period of 1 nm to 1 μm.

3. An epoxy resin composition as described in claim 1 wherein the epoxy resin [B1] is a trifunctional aminophenol-type epoxy resin.

4. An epoxy resin composition as described in claim 1 wherein the curing agent [D] is dicyandiamide or a derivative thereof.

5. An epoxy resin composition as described in claim 1 further containing at least one block copolymer [E] having a structure selected from the group consisting of S-B-M, B-M and M-B-M in an amount of 1 to 10 parts by mass per 100 parts by mass of total epoxy resin content, wherein each of the blocks denoted by the letters S, B and M is connected to another directly by means of a covalent bond or via a chemical structure, block M comprising a homopolymer of polymethyl methacrylate or a copolymer containing at least 50 mass % of methyl methacrylate, block B being incompatible with block M and having a glass transition temperature of 20° C. or less, and block S being incompatible with blocks B and M and having a glass transition temperature higher than that of block B.

6. An epoxy resin composition as described in claim 5 wherein the block copolymer [E] is a block copolymer denoted as M-B-M and block M contains as a copolymerization component a monomer having a SP value higher than that of methyl methacrylate.

7. An epoxy resin composition as described in claim 5 wherein block B of the block copolymer [E] is poly(1,4-butadiene) or poly(butyl acrylate).

8. An epoxy resin composition as described in claim 1 having a viscosity at 80° C. of 0.5 to 200 Pa·s and curable into a cured resin having a toughness of 1.3 MPa·m$^{0.5}$ or more.

9. A prepreg containing an epoxy resin composition as described in claim 1 and reinforcing fiber.

10. A fiber-reinforced composite material produced by curing a prepreg described in claim 9.

11. A fiber-reinforced composite material containing a cured resin of an epoxy resin composition as described in claim 1 and reinforcing fiber.

12. The epoxy resin composition according to claim 1, wherein [C1] is a bisphenol F-type epoxy resin with a number average molecular weight of about 340.

13. The epoxy resin composition according to claim 1, wherein the modulus of the cured resin is between 4.0 Gpa and 5.0 Gpa and wherein the toughness of the cured resin is more than 1.3 MPa·m$^{0.5}$.

14. The epoxy resin composition according to claim 1, wherein a block copolymer of S-B-M, B-M, or M-B-M is excluded.

* * * * *